US012812657B2

(12) United States Patent
Jiang et al.

(10) Patent No.: US 12,812,657 B2
(45) Date of Patent: Nov. 24, 2026

(54) INFORMATION FEEDBACK METHOD AND APPARATUS, AND INFORMATION RECEIVING METHOD AND APPARATUS

(71) Applicant: 1FINITY Inc., Kawasaki (JP)

(72) Inventors: Qinyan Jiang, Beijing (CN); Lei Zhang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 372 days.

(21) Appl. No.: 18/431,145

(22) Filed: Feb. 2, 2024

(65) Prior Publication Data

US 2024/0260053 A1 Aug. 1, 2024

Related U.S. Application Data

(63) Continuation of application No. PCT/CN2021/111357, filed on Aug. 6, 2021.

(51) Int. Cl.
*H04W 72/232* (2023.01)
*H04L 1/1829* (2023.01)
(Continued)

(52) U.S. Cl.
CPC ......... *H04W 72/232* (2023.01); *H04L 1/1861* (2013.01); *H04W 72/0446* (2013.01); *H04W 72/1273* (2013.01)

(58) Field of Classification Search
CPC ........... H04W 72/232; H04W 72/0446; H04W 72/1273; H04L 1/1861
See application file for complete search history.

(56) References Cited

U.S. PATENT DOCUMENTS

| | | | | |
|---|---|---|---|---|
| 2020/0344012 | A1 | 10/2020 | Karaki et al. | |
| 2021/0067276 | A1 | 3/2021 | Wang et al. | |
| 2021/0153185 | A1* | 5/2021 | Schober | H04L 5/0051 |

FOREIGN PATENT DOCUMENTS

| | | | | |
|---|---|---|---|---|
| CN | 110505045 | A | 11/2019 | |
| WO | 2020/204550 | A1 | 10/2020 | |
| WO | WO-2020204526 | A1 * | 10/2020 | H04W 72/23 |

OTHER PUBLICATIONS

Eirina, Deep Joint Source-Channel Coding for Wireless Image Transmission, 2019, 3GPP, pp. 1-13.*

(Continued)

*Primary Examiner* — Samina F Choudhry
(74) *Attorney, Agent, or Firm* — Myers Wolin, LLC

(57) ABSTRACT

Embodiments of this disclosure provide an information feeding back method and apparatus, an information receiving method and apparatus. The feeding back information apparatus includes: a determining unit configured to determine a candidate PDSCH reception occasion set according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and a processing unit configured to generate and transmit an HARQ-ACK codebook, the codebook including HARQ-ACK information to which the candidate PDSCH reception occasion set corresponds.

19 Claims, 6 Drawing Sheets

(51) Int. Cl.
*H04W 72/0446* (2023.01)
*H04W 72/1273* (2023.01)

(56) References Cited

OTHER PUBLICATIONS

NEC, "Discussion on PDSCH enhancements supporting NR from 52.6GHz to 71 GHZ", Agenda Item: 8.2.5, 3GPP TSG RAN WG1 #104-bis-e, R1-2103513, e-Meeting, Apr. 12-20, 2021.

Extended European Search Report with the Supplementary search report and the European search opinion, issued by the European Patent Office for corresponding European patent application No. 21952453.5, mailed on Apr. 15, 2025.

International Search Report and Written Opinion of the International Searching Authority issued for the International Patent Application No. PCT/CN2021/111357, mailed on Apr. 26, 2022, with an English translation.

Zte et al., "Discussion on the PDSCH/PUSCH enhancements for 52.6 to 71GHz", Agenda Item: 8.2.5, 3GPP TSG-RAN WG1 #104b-e, R1-2104835, e-Meeting, May 10-27, 2021.

Oppo, "Discussion on PDSCH/PUSCH enhancements", Agenda Item: 8.2.5, 3GPP TSG-RAN WG1 #106-e, R1-2107241, e-Meeting, Aug. 16-27, 2021.

* cited by examiner

1201 the network device receives, an HARQ-ACK codebook generated according to a candidate PDSCH reception occasion set and transmitted by a terminal equipment; wherein the candidate PDSCH reception occasion set is determined according to a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined according to candidate PDSCH reception occasions to which a second slot corresponds determined according to a PDSCH time domain resource configuration to which the first slot corresponds

Fig.12

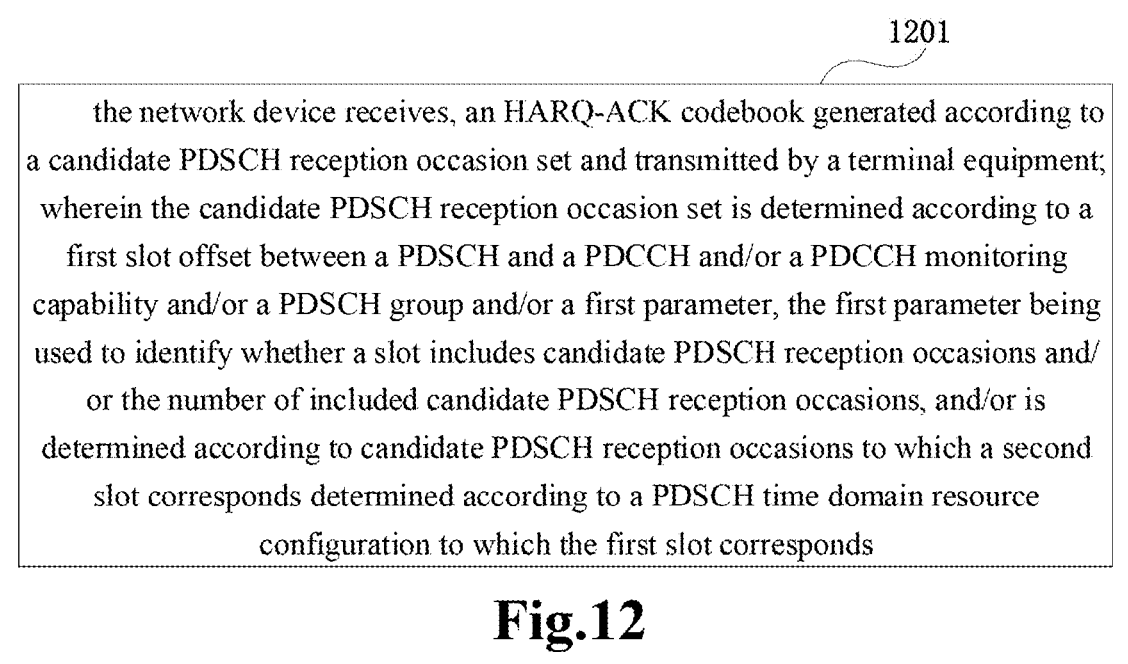

INFORMATION FEEDBACK METHOD AND APPARATUS, AND INFORMATION RECEIVING METHOD AND APPARATUS

CROSS-REFERENCE TO RELATED APPLICATION

This application is a continuation of International Application No. PCT/CN2021/111357, filed on Aug. 6, 2021, the entire contents of which are incorporated herein by reference.

TECHNICAL FIELD

This disclosure relates to the field of communication technologies.

BACKGROUND

A physical downlink shared channel (PDSCH) is one of physical downlink channels in a wireless communication system, and is used to carry downlink data. The PDSCH may be scheduled via downlink control information (DCI). The DCI used for scheduling the PDSCH at least includes information indicating resources of the PDSCH. In an existing New Radio (NR) system, a plurality of DCI formats for scheduling PDSCHs are defined, such as DCI format 1_0, DCI format 1_1, and DCI format 1_2. Specific information and/or sizes included in DCI in different DCI formats are different, so as to meet different demands for scheduling.

It should be noted that the above description of the background is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

At present, an NR system supports one DCI (PDCCH) scheduling a plurality of PDSCHs. However, there is currently no specific solution for how to support one DCI scheduling a plurality of PDSCHs (such as how to perform HARQ-ACK information feedback in a case where one DCI scheduling a plurality of PDSCHs is supported).

In order to solve at least one of the above problems, an embodiment of this disclosure provide an information feeding back apparatus, applicable to a terminal equipment, wherein the apparatus includes:

a determining unit configured to determine candidate PDSCH reception occasion set according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and a processing unit configured to generate and transmit an HARQ-ACK codebook, the codebook including HARQ-ACK information to which the candidate PDSCH reception occasion set corresponds.

According to another aspect of the embodiments of this disclosure, there is provided an information receiving apparatus, applicable to a network device, wherein the apparatus includes:

a first receiving unit configured to receive an HARQ-ACK codebook generated according to a candidate PDSCH reception occasion set and transmitted by a terminal equipment; wherein the candidate PDSCH reception occasion set is determined based on a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined based on candidate PDSCH reception occasions to which a second slot corresponds determined according to a PDSCH time domain resource configuration to which the first slot corresponds.

An advantage of the embodiments of this disclosure exists in that HARQ-ACK information feedback for one DCI scheduling a plurality of PDSCHs may be supported, and a scheduling method in which one DCI schedules a plurality of PDSCHs is also supported, thereby reducing PDCCH monitoring burden of a UE, and reducing power consumption and UE complexity.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/including/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

FIG. 12 is a schematic diagram of the information receiving apparatus of an embodiment of this disclosure.

DETAILED DESCRIPTION OF THE DISCLOSURE

Figure 1:
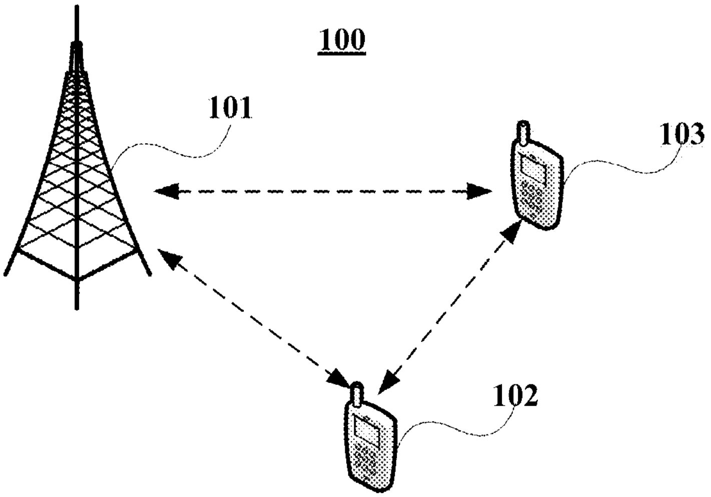
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms “first”, and “second”, etc., are used to differentiate different elements with respect to names, and do not indicate spatial arrangement or temporal orders of these elements, and these elements should not be limited by these terms. Terms “and/or” include any one and all combinations of one or more relevantly listed terms. Terms “contain”, “include” and “have” refer to existence of stated features, elements, components, or assemblies, but do not exclude existence or addition of one or more other features, elements, components, or assemblies.

In the embodiments of this disclosure, single forms “a”, and “the”, etc., include plural forms, and should be understood as “a kind of” or “a type of” in a broad sense, but should not defined as a meaning of “one”; and the term “the” should be understood as including both a single form and a plural form, except specified otherwise. Furthermore, the term “according to” should be understood as “at least partially according to”, the term “based on” should be understood as “at least partially based on”, except specified otherwise.

In the embodiments of this disclosure, the term “communication network” or “wireless communication network” may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G and 5G and new radio (NR) in the future, etc., and/or other communication protocols that are currently known or will be developed in the future.

In the embodiments of this disclosure, the term “network device”, for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term “base station” may include some or all of its functions, and each base station may provide communication coverage for a specific geographical area. And a term “cell” may refer to a base station and/or its coverage area, which may be expressed as a serving cell, and may be a macro cell or a pico cell, depending on a context of the term.

In the embodiments of this disclosure, the term “user equipment (UE)” or “terminal equipment (TE) or terminal device” refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term “network side” or “network device side” refers to a side of a network, which may be a base station or a core network device, and may include one or more network devices described above. The term “user side” or “terminal side” or “terminal equipment side” refers to a side of a user or a terminal, which may be a UE, and may include one or more terminal equipment described above. “Device” may refer to a network device, or may refer to a terminal equipment.

In the embodiments of this disclosure, a time unit may be a subframe, or a slot, or a set containing at least one time domain symbol. The set of at least one time domain symbol may also be referred to as a mini-slot or a non-slot. For example, in the embodiments of this disclosure, a subframe and a slot are interchangeable, and “a slot” may also be replaced with “a subframe”, and this disclosure is not limited there. For the sake of convenience, following description shall be given by taking “a slot” as an example; however, it may also be replaced with other time units. In addition, the terms “a time domain resource” and “a resource” are interchangeable.

In the following description, without causing confusion, the terms “uplink control signal” and “uplink control information (UCI)” or “physical uplink control channel (PUCCH)” are interchangeable, and terms “uplink data signal" and "uplink data information" or "physical uplink shared channel (PUSCH)" are interchangeable.

The terms "downlink control signal" and "downlink control information (DCI)" or "physical downlink control channel (PDCCH)" are interchangeable, and the terms "downlink data signal" and "downlink data information" or "physical downlink shared channel (PDSCH)" are interchangeable.

In addition, transmitting or receiving a PUSCH may be understood as transmitting or receiving uplink data carried by the PUSCH, transmitting or receiving a PUCCH may be understood as transmitting or receiving uplink information (e.g. UCI) carried by the PUCCH, transmitting or receiving a PRACH may be understood as transmitting or receiving a preamble carried by the PRACH, transmitting or receiving a PDSCH may be understood as transmitting or receiving downlink data carried by the PDSCH, and transmitting or receiving a PDCCH may be understood as transmitting or receiving downlink information (e.g. DCI) carried by the PDCCH.

In the embodiments of this disclosure, higher-layer signaling may be, for example, radio resource control (RRC) signaling; for example, it is referred to an RRC message, which includes a master information block (MIB), system information, and a dedicated RRC message; or, it is referred to an as an RRC information element (RRC IE). Higher-layer signaling may also be, for example, medium access control (MAC) signaling, or an MAC control element (MAC CE); however, this disclosure is not limited thereto.

Scenarios in the embodiments of this disclosure shall be described below by way of examples; however, this disclosure is not limited thereto.

FIG. 1 is a schematic diagram of a communication system of an embodiment of this disclosure, in which a case where terminal equipment and a network device are taken as examples is schematically shown. As shown in FIG. 1, the communication system 100 may include a network device 101 and terminal equipment 102, 103. For the sake of simplicity, an example having only two terminal equipment and one network device is schematically given in FIG. 1; however, the embodiments of this disclosure is not limited thereto.

In the embodiments of this disclosure, existing services or services that may be implemented in the future may be performed between the network device 101 and the terminal equipment 102, 103. For example, such services may include but not limited to an enhanced mobile broadband (eMBB), massive machine type communication (mMTC), ultra-reliable and low-latency communication (URLLC), and related communications of reduced capability terminal equipment, etc.

It should be noted that FIG. 1 shows that two terminal equipment 102, 103 are both within coverage of the network device 101. However, this disclosure is not limited thereto, and the two terminal equipment 102, 103 may not be within the coverage of the network device 101, or one terminal equipment 102 is within the coverage of the network device 101 and the other terminal equipment 103 is outside the coverage of the network device 101.

In the embodiments of this disclosure, transport blocks carried by different PDSCHs are identical or different. Therefore, "a plurality of PDSCHs" or "at least two PDSCHs" below refers to different PDSCHs carrying different transport blocks. More specifically, the transport blocks carried by different PDSCHs may correspond to identical or different HARQ processes, wherein different HARQ processes are identified by different HARQ process identifiers.

In some embodiments, a PDSCH time domain resource allocation (TDRA) table (or a TDRA table in brief) includes at least one row, one row is hereinafter referred to as one PDSCH TDRA configuration (or one TDRA configuration in brief) for ease of description, that is, the PDSCH TDRA table includes at least one PDSCH TDRA configuration. One PDSCH TDRA configuration includes at least one PDSCH time domain resource configuration (or referred to as a time domain resource configuration in brief), one PDSCH time domain resource configuration at least includes a symbol position (starting symbol+length) configuration in a slot; in addition, one PDSCH TDRA configuration may further include at least one slot offset K0 configuration, K0 denoting a slot offset between a PDSCH and a PDCCH, and the K0 configuration being included or not included in the PDSCH time domain resource configuration; the PDSCH TDRA configuration may further include other information, which is included or not included in a PDSCH time domain resource configuration, and the embodiments of this disclosure is not limited thereto. Wherein, regarding the symbol position configuration in the slot, it includes, for example, a start and length indicator SLIV, the SLIV corresponding to a valid combination of a starting symbol (S) and a length (L), or, for example, corresponding to a starting symbol configuration and a length configuration, the starting symbol configuration and a length configuration being a valid combination.

Following description shall be given with reference to various embodiments.

Embodiments of a First Aspect

The embodiments of this disclosure provides an information feeding back method, which shall be described from a terminal equipment side.

Figure 2:
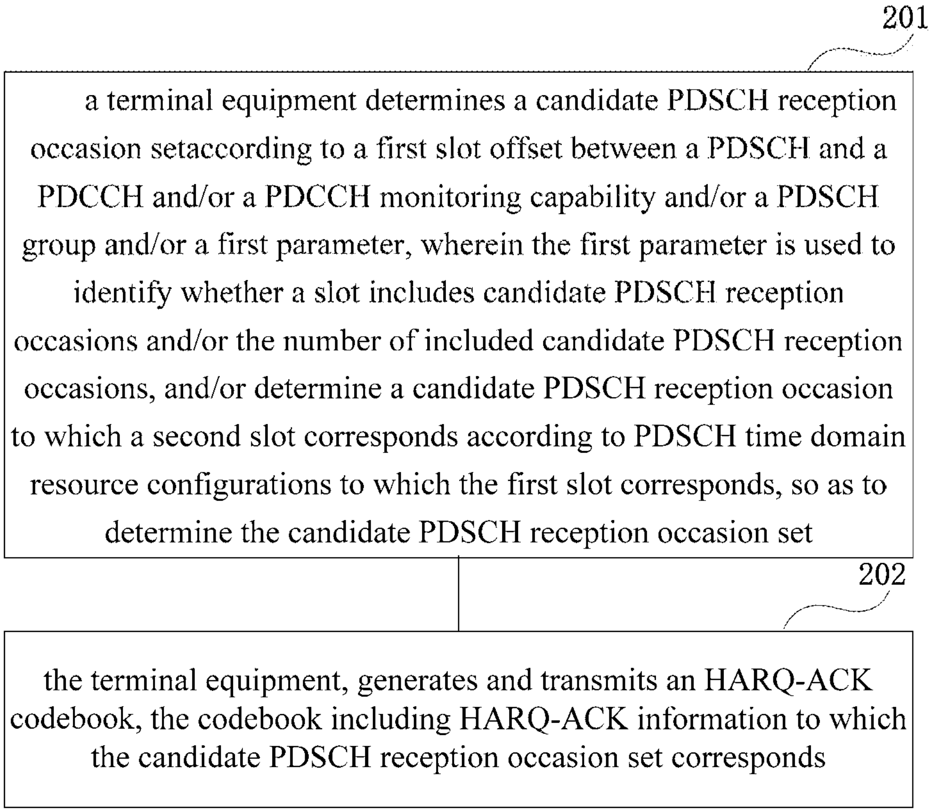
FIG. 2 is a schematic diagram of the information feeding back method of an embodiment of this disclosure.

FIG. 2 is a schematic diagram of the information feeding back method of the embodiment of this disclosure. As shown in FIG. 2, the method includes:

201: a terminal equipment determines a candidate PDSCH reception occasion set according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and

202: the terminal equipment generates and transmits an HARQ-ACK codebook, the codebook including HARQ-ACK information to which the candidate PDSCH reception occasion set corresponds.

In some embodiments, the terminal equipment needs to perform HARQ-ACK feedback for the received PDSCH (such as a PDSCH scheduled by DCI or a PDSCH of an SPS) or DCI (such as DCI used to deactivate an SPS). The HARQ-ACK feedback information may be carried by an HARQ-ACK codebook (such as a Type-1 HARQ-ACK codebook, or referred to as a semi-static HARQ-ACK codebook), which may include HARQ-ACK information bits of one or more serving cells. How to determine HARQ-ACK information bits of one serving cell shall only be described below. In a case where the codebook includes HARQ-ACK information bits of a plurality of serving cells, a mode of determination of the HARQ-ACK information bits of the serving cells is identical to a mode of determination of the HARQ-ACK information bits of the above-described one serving cell. The HARQ-ACK information bits of a plurality of serving cells are arranged in a certain order in the codebook, which shall not be enumerated herein any further.

In some embodiments, the codebook includes HARQ-ACK information bits to which a second number (A) of candidate PDSCH reception occasions correspond, the second number being a natural number. The second number of (A) candidate PDSCH reception occasions correspond to the same serving cell (i.e. the above-described one serving cell), that is, the second number of (A) candidate PDSCH reception occasions belong to the candidate PDSCH reception occasion set $M_{A,c}$ of the serving cell. In existing techniques, as it is only supported that one DCI scheduling one PDSCH and each PDSCH TDRA configuration includes only one PDSCH time domain resource configuration, in determining the candidate PDSCH reception occasion set, a case where each PDSCH TDRA configuration includes one PDSCH time domain resource configuration (i.e. a symbol position (starting symbol+length) configuration in a slot, e.g. an SLIV) is taken into account only. In this disclosure, in order to support one DCI scheduling a plurality of PDSCHs, a case where at least one PDSCH TDRA configuration includes a plurality of PDSCH time domain resource configurations is taken into account in determining the candidate PDSCH reception occasion set. Specifically, for example, it is needed to take the first slot offset between the PDSCH and PDCCH and/or the PDCCH monitoring capability and/or the PDSCH group and/or the first parameter into account in determining the candidate PDSCH reception occasion set, wherein the first parameter is used to identify whether the slot includes candidate PDSCH reception occasions and/or the number of included candidate PDSCH reception occasions, and/or take the PDSCH time domain resource configuration to the first slot corresponds into account in determining the candidate PDSCH reception occasions to which the second slot corresponds, so as to determine the candidate PDSCH reception occasion set. By taking the above factors into account, HARQ-ACK information feedback of one DCI scheduling a plurality of PDSCHs may be supported, thereby supporting a scheduling method in which one DCI scheduling a plurality of PDSCHs, reducing a PDCCH monitoring burden of the UE, and reducing power consumption and UE complexity, which shall be described below respectively.

In some embodiments, before determining the candidate PDSCH reception occasions, the terminal equipment needs to determine HARQ-ACK information feedback timing (i.e. the terminal equipment needs to determine a slot (uplink slot) for transmitting HARQ-ACK information).

In some embodiments, the terminal equipment receives DCI for scheduling a PDSCH, and the terminal equipment determines the slot for transmitting the HARQ-ACK information according to an information field (PDSCH-to-HARQ_feedback timing indicator field) used to indicate HARQ-ACK information feedback timing in the DCI. For example, the DCI schedules one or a plurality of PDSCHs.

In some embodiments, the terminal equipment receives downlink control information (DCI) for scheduling a physical downlink shared channel (PDSCH), a PDSCH TDRA table applied by the DCI supporting one DCI scheduling a plurality of PDSCHs; and the terminal equipment determines the HARQ-ACK information feedback timing according to the DCI.

In some embodiments, the HARQ-ACK information (or HARQ-ACK codebook) is carried by a PUCCH or a PUSCH. The HARQ-ACK feedback timing shall be described below by taking that a PUCCH carries the HARQ-ACK information as an example. Optionally, the PUCCH below may be replaced with a PUSCH, which is not limited in this disclosure.

In some embodiments, the terminal equipment feeds back HARQ-ACK information to which at least one PDSCH scheduled by the DCI corresponds via the same HARQ-ACK codebook or different HARQ-ACK codebooks. Feeding back HARQ-ACK information to which at least one PDSCH scheduled by the DCI corresponds via different HARQ-ACK codebooks includes that: the at least one PDSCH is divided into a first number of groups, HARQ-ACK information to which the same PDSCH group corresponds is fed back by the same HARQ-ACK codebook, and HARQ-ACK information to which different PDSCH groups correspond is fed back by different HARQ-ACK codebooks, and the terminal equipment may transmit the different HARQ-ACK codebooks on different slots.

In some embodiments, optionally, the DCI scheduling a plurality of PDSCHs may include a second information field. The second information field may be a HARQ-ACK feedback timing indicator (i.e. PDSCH-to-HARQ feedback timing indicator) field, and the second information field is used to indicate a feedback timing k of the HARQ-ACK information. Or, the DCI may also not include the second information field, and the terminal equipment receives second configuration information configured by higher-layer signaling (such as dl-DataToUL-ACK or dl-DataToUL-ACKForDCIFormat1_2 for DCI format 1_2). The second configuration information is used to indicate the feedback timing k of the HARQ-ACK information, or the terminal equipment receives the second configuration information configured by higher-layer signaling (such as dl-DataToUL-ACK or di-DataToUL-ACKForDCIFormat1_2 for DCI format 1_2), which is used to configure feedback timings of a plurality of HARQ-ACK information. The DCI may also include the second information field, which is used to indicate one feedback timing k of the HARQ-ACK information from a plurality of feedback timings configured by the second configuration information.

For example, the HARQ-ACK information to which one or a plurality of PDSCHs scheduled by the DCI correspond may be fed back on the same PUCCH.

Figure 3:
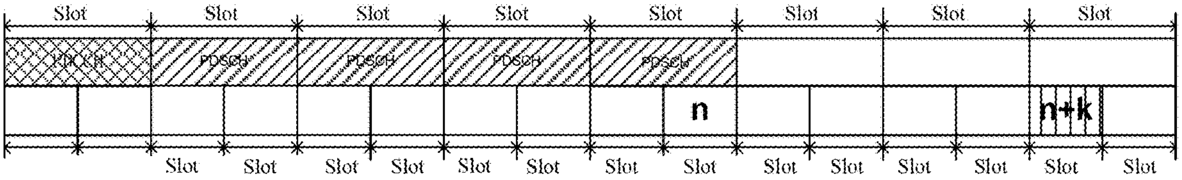
FIG. 3 is a schematic diagram of an HARQ-ACK information feedback slot of an embodiment of this disclosure.

For example, the HARQ-ACK information of the plurality of PDSCHs may be fed back on one PUCCH. Taking that $2^{\mu_{DL}-\mu_{UL}}$==1 as an example, the terminal equipment transmits the HARQ-ACK information on a slot with an index n+k (slot n+k), wherein a slot with an index n (slot n) is an ending slot of a last PDSCH in the plurality of PDSCHs; wherein, n and k are integers greater than 0. That is, the ending slot of the last PDSCH is n, k is an offset between a feedback slot of the HARQ-ACK information and slot n, and a relationship between a downlink ending slot n of the PDSCH and an index of its corresponding uplink slot may be determined according to uplink and downlink subcarrier spacings, and reference may be made to existing techniques for details, which shall not be repeated herein any further. FIG. 3 is a schematic diagram of the feedback timing. As shown in FIG. 3, one PDCCH actually schedules four PDSCHs, an ending downlink slot of the last PDSCH is n, and the HARQ-ACK information is transmitted on slot n+k; wherein, a value of k is indicated by the second information field in the DCI, or is configured by RRC signaling via configuration information.

Figure 4:
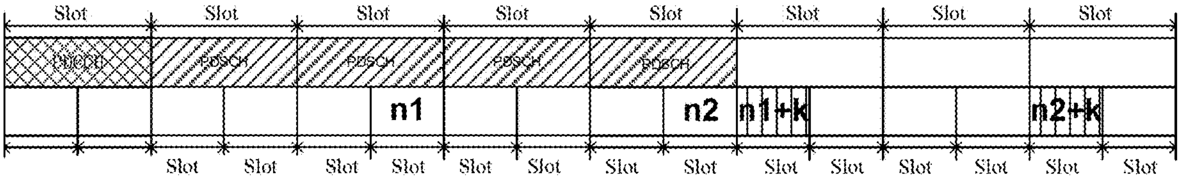
FIG. 4 is another schematic diagram of the HARQ-ACK information feedback slot of the embodiment of this disclosure.

For example, the HARQ-ACK information to which the one or a plurality of PDSCHs scheduled by the DCI correspond may be fed back on different (slot) PUCCHs, wherein at least one PDSCH is divided into a first number of groups, HARQ-ACK information to which the same group of PDSCHs correspond is fed back on the same PUCCH, and HARQ-ACK information to which different groups of PDSCHs correspond is fed back on different PUCCHs. Configuration or information identical to those in "the HARQ-ACK information to which one or a plurality of PDSCHs scheduled by the DCI correspond is fed back on the same PUCCH" will not be repeated herein any further. FIG. 4 is a schematic diagram of the feedback timing. As shown in FIG. 4, one PDCCH actually schedules four PDSCHs, and two adjacent PDSCHs are divided into one group, wherein an ending downlink slot of a second PDSCH is n1, an ending downlink slot of a last PDSCH is n2, HARQ-ACK information to which former two PDSCHs correspond is fed back at an uplink slot n1+k, and HARQ-ACK information to which latter two PDSCHs correspond is fed back at an uplink slot n2+k; where, a value of k is indicated by the second information field in the DCI, or is configured by RRC signaling via configuration information.

Figure 5:
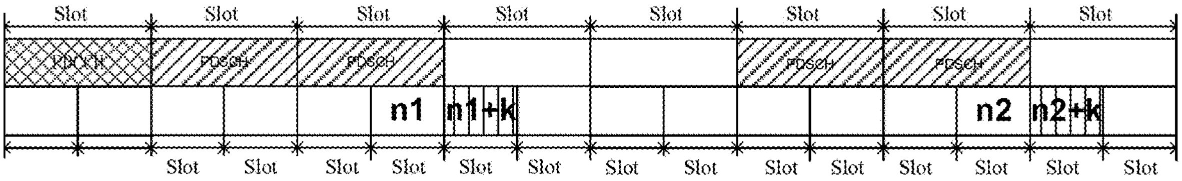
FIG. 5 is a further schematic diagram of the HARQ-ACK information feedback slot of the embodiment of this disclosure.

In some embodiments, the HARQ-ACK information to which the one or a plurality of PDSCH groups scheduled by the DCI correspond may be fed back on different (slot) PUCCHs. That is, the HARQ-ACK information to which the same group of PDSCHs correspond is fed back on the same PUCCH, and the HARQ-ACK information to which different groups of PDSCHs correspond is fed back on different PUCCHs. For example, the groups of the HARQ-ACK information feedback timing are in consistence with the above PDSCH groups, that is, the HARQ-ACK information to which PDSCHs in the same PDSCH group correspond is fed back on the same PUCCH, and the HARQ-ACK information to which PDSCHs at different PDSCH groups correspond is fed back on different (slot) PUCCHs. FIG. 5 is a schematic diagram of the feedback timing. As shown in FIG. 5, one PDCCH actually schedules four PDSCHs, a first PDSCH and a second PDSCH are divided into a first PDSCH group, and a third PDSCH and a fourth PDSCH are divided into a second PDSCH group, wherein an ending downlink slot of the first PDSCH group is n1, an ending downlink slot of the second PDSCH group is n2, the HARQ-ACK information to which the first PDSCH group corresponds is fed back on an uplink slot n1+k, and the HARQ-ACK information to which the second PDSCH group corresponds is fed back on an uplink slot n2+k; wherein, a value of k is indicated by the second information field in the DCI, or is configured by RRC signaling via configuration information. For example, the DCI may indicate values of a plurality of k for different PDSCH groups respectively.

How to determine the HARQ-ACK feedback timing (i.e. determining the slot for transmitting the HARQ-ACK information) according to a value of k and the slots where the PDSCHs scheduled by the DCI are located are described above by taking that DCI for scheduling the PDSCHs to trigger HARQ-ACK information feedback is received as an example. However, the embodiments of this disclosure is not limited thereto, and when DCI for deactivating an SPS is received, the HARQ-ACK information feedback may also be triggered, and when the UE determines the HARQ-ACK feedback timing according to the value of k indicated by the DCI for deactivating the SPS or configured by the RRC signaling via the configuration information and a slot where the DCI is located. Or when receiving DCI for activating the SPS, the HARQ-ACK feedback may also be triggered, and the UE determines the HARQ-ACK feedback timing according to a value of k indicated by the DCI for activating the SPS or configured by the RRC signaling via the configuration information and a slot where a PDSCH of the SPS activated by the DCI is located, which shall not be enumerated herein any further.

In some embodiments, after determining the time domain position or slot where the HARQ-ACK information needs to be fed back, the terminal equipment may determine the candidate PDSCH reception occasions, and generate corresponding codebooks. How to determine the candidate PDSCH reception occasion shall be described below.

In some embodiments, in order to determine the candidate PDSCH reception occasion set, it is needed to determine downlink slots that may possibly include (or correspond to) candidate PDSCH reception occasions.

In some embodiments, the downlink slot is determined according to a slot timing value $K_1$.

For example, for slots needing to transmit the HARQ-ACK information, such as slot $n_u$, according to a slot timing value $K_1$ set associated with an active uplink bandwidth part (UL BWP), one or a plurality of downlink slots $n_D$ corresponding to each $K_1$ in the $K_1$ set may be respectively determined; wherein, $K_1$ denotes a value of an offset of the PDSCH relative to the HARQ-ACK information feedback slot $n_D$ (i.e. a value of k that may be indicated in the above DCI). In determining the one or a plurality of downlink slots to which each $K_1$ corresponds, optionally, subcarrier spacings of uplink and downlink bandwidth parts need to be taken into account, and one $K_1$ may possibly correspond to a plurality of downlink slots. Reference may be made to existing techniques for details, and the embodiments of this disclosure is not limited thereto.

In some embodiments, reference may be made to existing techniques for the determination of the $K_1$ set associated with the active uplink bandwidth (UL BWP). Or, on the basis of existing factors, the determination of the K1 set is also performed according to the number of PDSCH time domain resource configurations included in the PDSCH TDRA configuration, or a maximum value in the number of PDSCH time domain resource configurations included in at least two PDSCH TDRA configurations (or a maximum number of PDSCHs that may be scheduled by one DCI); however, the embodiment is not limited thereto.

In some embodiments, on the basis of determining the downlink slot according to the slot timing value K1, the downlink slot is also determined according to the number of PDSCH time domain resources included in the PDSCH TDRA configuration, or a maximum value in the number of PDSCH time domain resource configurations included in at least two PDSCH TDRA configurations (or a maximum number of PDSCHs that may be scheduled by one DCI). For example, in a case where the K1 set is determined in existing techniques, the downlink slot is determined according to the number of PDSCH time domain resource configurations included in the PDSCH TDRA configuration (or the number of PDSCHs that may be scheduled by the DCI).

In some embodiments, the terminal equipment may determine the PDSCH time domain resource configuration to which the slot (downlink slot) corresponds according to the number and/or serial numbers of the PDSCH time domain resource configurations included in the PDSCH time domain resource allocation configuration and the slot timing value (such as the above K1 set).

For example, for a downlink slot, the PDSCH time domain resource configuration to which the slot (downlink slot) corresponds is determined according to the number and/or serial numbers of the PDSCH time domain resource configurations included in the PDSCH time domain resource allocation configuration, and whether the slot has a corresponding candidate PDSCH reception occasion is determined according to the PDSCH time domain resource configuration and the following considerations, thereby determining the candidate PDSCH reception occasion set. It should be noted that the determination of the above downlink slots and the PDSCH time domain resource configurations to which the slots correspond may be executed sequentially or simultaneously, and this disclosure is not limited thereto.

In some embodiments, the terminal equipment may determine the candidate PDSCH reception occasion set according to the PDSCH groups.

For example, the terminal equipment determines the candidate PDSCH reception occasion set according to the PDSCH time domain resource configuration corresponding to the codebook in the PDSCH time domain resource allocation configuration. In some embodiments, reference may be made to existing techniques for a method for determining the candidate PDSCH reception occasion set according to the PDSCH time domain resource configuration corresponding to the codebook, or it may be determined with reference to following factors (which shall be described later), which shall not be repeated herein any further.

Therefore, in the case where the PDSCH time domain resource allocation configuration includes PDSCH time domain resource configuration not corresponding to the codebook, the terminal equipment does not determine the candidate PDSCH reception occasion set according to the PDSCH time domain resource configuration not corresponding to the codebook. That is, in the case of grouping the PDSCHs, the codebook generated in 202 of this disclosure refers to a codebook generated for one group of PDSCHs, different codebooks correspond to different PDSCH groups, and for other groups of PDSCHs, they may be directly excluded from the candidate PDSCH reception occasions.

For example, the terminal equipment determines the PDSCH time domain resource configuration corresponding to the codebook in the PDSCH time domain resource allocation configuration according to the number and/or serial number and/or groups of the PDSCH time domain resource configuration included in the PDSCH time domain resource allocation configuration. For example, if a PDSCH time domain resource allocation configuration includes only one PDSCH time domain resource configuration, the PDSCH time domain resource configuration corresponds to the codebook. For example, if a PDSCH time domain resource allocation configuration includes at least two PDSCH time domain resource configurations, positions of the at least two PDSCH time domain resources correspond to at least two codebooks fed back on different slots (the at least two codebooks fed back on different slots, for example, are triggered by the same DCI) in an order of serial numbers. For example, if a PDSCH time domain resource allocation configuration includes at least two PDSCHs and they are divided into at least two (such as a first number) PDSCH groups, positions of the at least two PDSCH time domain resources correspond to at least two codebooks fed back on different slots (the at least two codebooks fed back on different slots, for example, are triggered by the same DCI) in an order of serial numbers.

In some embodiments, the terminal equipment may determine the candidate PDSCH reception occasion set according to the first slot offset between the PDSCH and PDCCH and/or the PDCCH monitoring capability.

In some embodiments, the PDCCH is used for scheduling the PDSCH, and a DCI format of the DCI carried on the PDCCH may be DCI format 1_0, or DCI format 1_1, or DCI format 1_2, or a new DCI format introduced additionally; however, the embodiments of this disclosure is not limited thereto.

In some embodiments, the DCI used for scheduling the PDSCH may be scrambled by a cell radio network temporary identifier (C-RNTI), or a modulation coding scheme C-RNTI (MCS-C-RNTI), or a configuration scheduling RNTI (CS-RNTI), or a temporary C-RNTI (TC-RNTI), or a system information RNTI (SI-RNTI), or a random access RNTI (RA-RNTI), or an MsgB-RNTI in a random access response, or a paging RNTI (P-RNTI), or a new RNTI introduced additionally, etc.; however, the embodiments of this disclosure is not limited thereto.

In some embodiments, candidate PDSCH reception occasions may be determined according to the first slot offset between PDSCH and PDCCH. In existing methods, for the PDSCH TDRA table, only the PDSCH time domain resource configuration (such as the SLIV configuration) is taken into account, while in this disclosure, at least one slot offset K0 configuration in the PDSCH TDRA table needs to be taken into account, and the first slot offset may be determined according to the at least one slot offset K0 configuration, and determination thereof shall be described later.

In some embodiments, the first slot offset is a slot offset between a time domain resource of a first PDSCH configured in the PDSCH time domain resource allocation configuration and the PDCCH scheduling the PDSCH. When the PDSCH time domain resource allocation configuration includes a plurality of PDSCH time domain resource configurations, the first PDSCH is a PDSCH to which a first PDSCH time domain resource configuration in the plurality of PDSCH time domain resource configurations corresponds, and when the PDSCH time domain resource allocation configuration includes one PDSCH time domain resource configuration, the first PDSCH is the PDSCH to which the one PDSCH time domain resource configuration corresponds.

In some embodiments, the terminal equipment determines a time domain position of the PDCCH to which the PDSCH time domain resource allocation configuration corresponds (a time domain position where a PDCCH should be transmitted that scheduling corresponding PDSCH by indicating the PDSCH TDRA configuration) according to the first slot offset; and the terminal equipment determines the candidate PDSCH reception occasions according to whether the PDCCH may be transmitted at the time domain position, such as determining whether the PDCCH may be transmitted at the time domain position, and when it determines that the PDCCH is unable to be transmitted, it excludes the PDSCH time domain resource scheduled by the PDCCH from the candidate PDSCH reception occasions.

Figure 6:
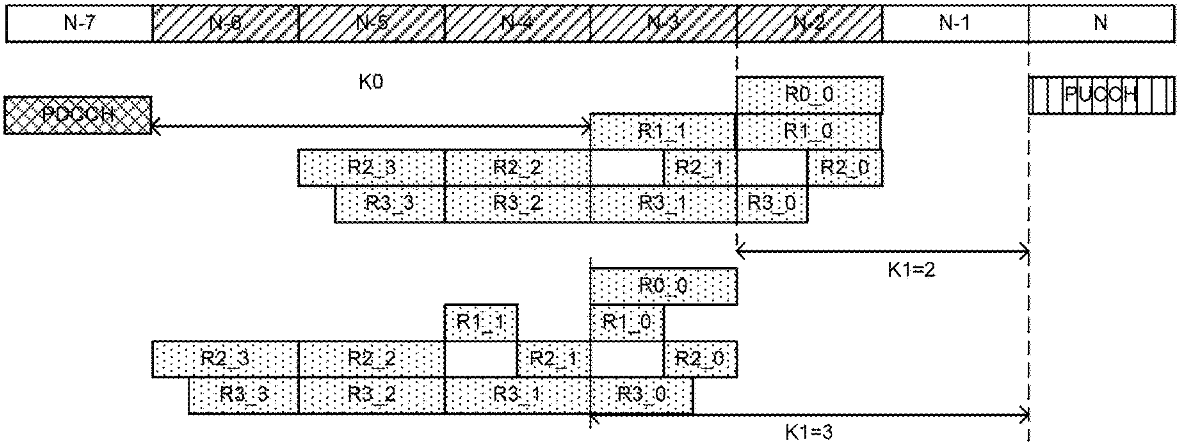
FIG. 6 is a schematic diagram of determining a candidate PDSCH reception occasion of an embodiment of this disclosure.

In some embodiments, for example, in FIG. 6, taking that a subcarrier spacing (SCS) of the PDCCH scheduling a plurality of PDSCHs, a subcarrier spacing (SCS) of the PDSCH and a subcarrier spacing (SCS) of a PUCCH or PUSCH performing HARQ-ACK information feedback are all identical as an example, in a case where the subcarrier spacing (SCS) of the PDCCH scheduling a plurality of PDSCHs, the subcarrier spacing (SCS) of the PDSCH and the subcarrier spacing (SCS) of the PUCCH or PUSCH performing HARQ-ACK information feedback are partially identical or completely different, this disclosure may also be applicable, and this disclosure is not limited thereto.

In some embodiments, as shown in FIG. 6, slot N is an uplink slot (UL slot N), and the terminal equipment (UE)

transmits the HARQ-ACK information on the UL slot N. It can be seen from the above implementation that a PDSCH reception occasion may be determined by the UE according to the HARQ-ACK information feedback timing k1 that is indicated by the DCI and/or is predefined and/or is configured by the RRC signaling. For example, if a value range of a parameter K1 of the HARQ-ACK information feedback timing that is indicated by the DCI and/or is predefined and/or is configured by the RRC signaling is {2,3}, in a case where K1=2, the HARQ-ACK information is fed back on UL slot N, and a downlink slot where a last PDSCH in the plurality of PDSCHs belonging to the same PDSCH TDRA configuration is DL slot N-2; likewise, in a case where K1=3, a downlink slot where a last PDSCH in the plurality of PDSCHs belonging to the same PDSCH TDRA configuration is DL slot N-3. Taking a plurality of (e.g. four) PDSCH TDRA configurations in FIG. 6 as an example, a first PDSCH TDRA configuration is {R0_0}, a second PDSCH TDRA configuration is {R1_0, R1_1}, a third PDSCH TDRA configuration is {R2_0, R2_1, R2_2, R2_3}, and a fourth PDSCH TDRA configuration is {R3_0, R31, R3_2, R3_3}, wherein meanings of R0, R1, R2 and R3 are the first to fourth rows in the PDSCH TDRA table, and furthermore, the third PDSCH TDRA configuration {R2_0, R2_1, R2_2, R2_3} is taken as an example, wherein a meaning R2_1 is a time domain resource configuration to which a second PDSCH in the third PDSCH TDRA configuration corresponds.

How to determine the candidate PDSCH reception occasions shall be described by taking FIG. 6 as an example. As shown in FIG. 6, according to the first slot offset between the first PDSCH in the plurality of PDSCHs belonging to the same PDSCH TDRA configuration and the PDCCH scheduling the plurality of PDSCHs, the time domain position where the PDCCH should be transmitted indicating the plurality of PDSCHs may be determined. Taking the second PDSCH TDRA configuration in FIG. 6 as an example, when K1=2, the UL slot of the HARQ-ACK information is N, then a slot of the last PDSCH in the second PDSCH TDRA configuration is DL slot N-2, and when the first slot offset is equal to 3, it may be determined that the time domain position of the PDCCH scheduling the plurality of PDSCHs should be DL slot N-7. Furthermore, according to contents on DL slot N-7, it may be determined whether the PDCCH may be transmitted on DL slot N-7, and then the candidate PDSCH reception occasions may be determined. For example, if the PDCCH is unable to be transmitted on DL slot N-7, that is, the PDSCH TDRA configuration indicated by the PDCCH is impossibly to be scheduled, it may be deemed that the SLIVs (corresponding to the starting symbol and symbol length of the PDSCH in a specific slot) in the PDSCH TDRA configuration indicated by the PDCCH are not the candidate PDSCH reception occasions, and the PDSCH time domain resources scheduled by the PDCCH are excluded from the candidate PDSCH reception occasions; on the contrary, if the PDCCH may be transmitted on DL slot N-7, that is, the PDSCH TDRA configuration indicated by the PDCCH may possibly be scheduled, it is deemed that the SLIVs (corresponding to the starting symbol and symbol length of the PDSCH) in the PDSCH TDRA configuration indicated by the PDCCH are the candidate PDSCH reception occasions.

In some embodiments, the terminal equipment determines whether the PDCCH may be transmitted at the time domain position according to a transmission direction of the time domain position, and/or whether the time domain position includes a search space of corresponding DCI, and/or whether a coreset associated with a search space of corresponding DCI included in the time domain position overlaps with an SSB.

In some embodiments, whether the PDCCH may be transmitted at the time domain position is determined according to a transmission direction of symbols (i.e. uplink symbols or downlink symbols) of the time domain position of the PDCCH scheduling the plurality of PDSCHs. For example, as shown in FIG. 6, DL slot N-7 is the time domain position where the PDCCH should be transmitted. If DL slot N-7 only includes uplink symbols, it means that DL slot N-7 is impossible to transmit the PDCCH, that is, the PDCCH is unable to be transmitted at the time domain position.

In some embodiments, whether the PDCCH may be transmitted at the time domain position is determined according to whether the search space of the DCI corresponding to the PDSCH TDRA table is included in the time domain position of the PDCCH scheduling the plurality of PDSCHs. For example, as shown in FIG. 6, DL slot N-7 is the time domain position where PDCCH is to be transmitted, and if DL slot N-7 does not include the search space of the DCI, it means that DL slot N-7 is impossible to transmit the PDCCH, that is, the PDCCH is unable to be transmitted at the time domain position.

In some embodiments, whether the PDCCH may be transmitted at the time domain position is determined according to whether a CORESET associated with the search space corresponding to the DCI included in the time domain position overlaps with an SSB, and if the CORESET overlaps with at least one resource element (RE) of the SSB, it means that the PDCCH is impossible to be transmitted on the slot.

Optionally, the above method for determining the candidate PDSCH reception occasions may also be combined with the above PDSCH group, such as in a case of feeding back the HARQ-ACK information on different PUCCHs (on slots). In determining PDSCH reception occasion corresponding to HARQ-ACK information for different PDSCH groups, methods for determining candidate PDSCH reception occasion for each group of PDSCHs are similar to the above implementations, which shall not be repeated herein any further.

In some embodiments, the candidate PDSCH reception occasions may be determined according to the first slot offset and the PDCCH monitoring capability.

In some embodiments, the first slot offset is a slot offset between a time domain resource of a first PDSCH configured in the PDSCH time domain resource allocation configuration and the PDCCH. The PDCCH monitoring capability refers to, for example, the number of PDCCHs that the UE may receive in a slot or a slot group or a symbol group (however, it is not limited thereto), and the terminal equipment determines the time domain position of the PDCCH corresponding to the PDSCH time domain resource allocation configuration according to the first slot offset, determines the candidate PDSCH reception occasions according to the PDCCH monitoring capability, such as determining whether to receive the PDCCH at the time domain position of the PDCCH according to the PDCCH monitoring capability, so as to determine the candidate PDSCH reception occasion set.

Figure 7:
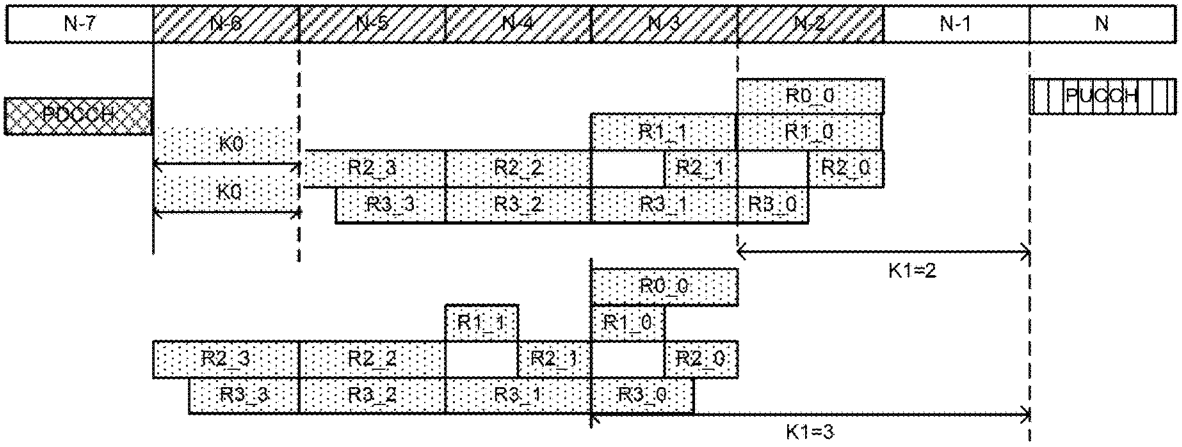
FIG. 7 is another schematic diagram of determining a candidate PDSCH reception occasion of the embodiment of this disclosure.

For example, as shown in FIG. 7, parameters identical to those in FIG. 6 shall not be repeated herein any further. For a case where K1=2, similar to FIG. 6, DL slot N-2 is the position of the last PDSCH in the plurality of PDSCHs in a PDSCH TDRA configuration. When the first slot offset is 3, expected slot positions of PDCCHs to which a third PDSCH TDRA configuration (R2) and a fourth PDSCH TDRA configuration (R3) correspond are on DL slot N-7. According to the monitoring capability for the PDCCH, the UE may monitor only one PDCCH on DL slot N-7, and even if transmission symbols of the PDSCH on DL slot N-2 indicated by SLIVs in the two PDSCH TDRA configurations do not conflict with the uplink symbols nor overlap therewith, at most one candidate PDSCH reception occasion is included, such as taking a longest symbol range indicated in the SLIVs as a candidate PDSCH reception occasion.

In some embodiments, in a case where the terminal equipment is configured with an SPS, when DCI used for activating the SPS is received before a predetermined time for transmitting the codebook, the terminal equipment does not determine the candidate PDSCH reception occasion set according to the first slot offset and/or the PDCCH monitoring capability, and in a case where the terminal equipment is configured with an SPS, the terminal equipment determines the candidate PDSCH reception occasion set according to a period configuration of the SPS.

In some embodiments, due to that an offset between an SPS PDSCH and DCI used to schedule the SPS PDSCH is not fixed as the first slot offset, it is needed to take a period configured by high layer signaling into account to determine a PDSCH reception occasion. For example, when the SPS is configured, the candidate PDSCH reception occasions are not determined according to the first slot offset and/or the PDCCH monitoring capability. Optionally, when the SPS is configured, if the DCI used to activate the SPS is not received before a certain period of time before transmitting the PUCCH, the candidate PDSCH reception occasions are determined according to the first slot offset and/or the PDCCH monitoring capability; otherwise, the candidate PDSCH reception occasions are not determined according to the first slot offset and/or the PDCCH monitoring capability.

In some embodiments, the candidate PDSCH reception occasions on the second slot may be determined according to the PDSCH time domain resource configuration to which the first slot corresponds.

In some embodiments, in a case where the first slot and the second slot correspond to PDSCH time domain resource configurations of different serial numbers in a first PDSCH time domain resource allocation configuration and PDSCH time domain resource configurations of different serial numbers in a second PDSCH time domain resource allocation configuration, candidate PDSCH reception occasions to which the second slot corresponds are determined according to whether the PDSCH time domain resource configuration in the first PDSCH time domain resource configuration to which the first slot corresponds and/or the PDSCH time domain resource configuration in the second PDSCH time domain resource allocation configuration conflict(s) with a semi-statically configured transmission direction, and/or according to whether a PDSCH time domain resource configuration in the first PDSCH time domain resource allocation configuration to which the first slot corresponds and/or a PDSCH time domain resource configuration in the second PDSCH time domain resource allocation configuration overlap, so as to determine the candidate PDSCH reception occasion set.

For example, the terminal equipment determines the first PDSCH time domain resource configuration and/or the second PDSCH time domain resource configuration to which the slot corresponds according to the number and/or serial numbers of the PDSCH time domain resource configurations included in the PDSCH time domain resource allocation configuration and the slot timing value, which are as described above, and shall not be repeated herein any further.

For example, as shown in FIG. 7, parameters identical to those in FIG. 6 shall not be repeated herein any further. For a case where K1=2, similar to FIG. 6, a first PDSCH time domain resource configuration and/or a second PDSCH time domain resource configuration to which DL slot N-4 (the first slot) corresponds is/are determined firstly according to the number and/or serial numbers of the PDSCH time domain resource configurations included in the PDSCH time domain resource allocation configuration. For example, DL slot N-2 (the second slot) is the position of the last PDSCH of the plurality of PDSCH in the PDSCH TDRA configuration, and when K0=3, a third PDSCH TDRA configuration (R2) and a fourth PDSCH TDRA configuration (R3) are taken as examples. On DL slot N-4 (the first slot), time domain resources of the PDSCHs to which SLIVs indicated by the third PDSCH TDRA configuration and the fourth PDSCH TDRA configuration correspond overlap (resources on R2_2 and R3_2 overlap), then for DL slot N-2, even if the time domain resources of the PDSCHs to which SLIVs indicated by the third PDSCH TDRA configuration and the fourth PDSCH TDRA configuration correspond do not overlap (resources on R2_2 and R3_2 do not overlap), only one candidate PDSCH reception occasion is included for DL slot N-2; for example, the time domain resources of the PDSCHs to which SLIVs indicated by the fourth PDSCH TDRA configuration correspond are randomly selected and taken as the candidate PDSCH reception occasions.

In some embodiments, the terminal equipment may also determine the candidate PDSCH reception occasion set according to a first parameter, the first parameter being used to identify whether a slot (a downlink slot) includes candidate PDSCH reception occasions and/or the number of included candidate PDSCH reception occasions.

In some embodiments, the first parameter is a parameter used to mark/record whether the DL slot includes candidate PDSCH reception occasions and/or the number of included candidate PDSCH reception occasions. As the PDSCH TDRA configuration may include at least two PDSCH time domain resource configurations, downlink slots corresponding to different values of K1 or candidate PDSCH reception occasions may possibly overlap. For example, as shown in FIG. 6 or FIG. 7, in the case of different values of K1, such as K1=2 or K1=3, R1_1 of the second PDSCH TDRA configuration of K1=2 and R0_0 of the first PDSCH TDRA configuration of K1=3 correspond to identical DL slots, and R3_2 of the fourth PDSCH TDRA configuration of K1=2 and R3_1 of the fourth PDSCH TDRA configuration of K1=3 correspond to identical DL slots. Therefore, in order to avoid repeated counting of downlink slots or candidate PDSCH reception occasions in determining the candidate PDSCH reception occasions, the first parameter used to mark whether a DL slot includes candidate PDSCH reception occasions and/or the number of included candidate PDSCH reception occasions may be introduced.

In some embodiments, taking that one DL slot includes at most one candidate PDSCH reception occasion as an example, an initial value of the first parameter indicates that the DL slot does not include a candidate PDSCH reception occasion. Furthermore, if it is determined in the above process of determining the candidate PDSCH reception occasions that an SLIV in SLIVs to which a DL slot corresponds is possibly used for the PDSCH scheduled on the DL slot (e.g. the SLIV does not include a UL symbol on symbols to which the DL slot corresponds), a field in the first parameter corresponding to the DL slot is set to indicate that the DL slot includes a value of a candidate PDSCH reception occasion; and on the other hand, for the DL slot, the UE does not need to take remaining values of K1 and/or other SLIVs to which the DL slot corresponds into account.

In some embodiments, the above methods for determining the candidate PDSCH reception occasions may be implemented separately, or may be implemented in a combined manner, and the embodiments of this disclosure is not limited thereto.

In some embodiments, corresponding candidate PDSCH reception occasions are determined for each DCI format, and then a union of the candidate PDSCH reception occasions is determined.

In some embodiments, corresponding candidate PDSCH reception occasions are determined for each PDSCH TDRA configuration group, and then a union of the candidate PDSCH reception occasions is determined. The PDSCH TDRA configuration groups are divided, for example, according to the number of PDSCHs scheduled by the PDSCH TDRA configurations. For example, PDSCH TDRA configurations used to schedule one PDSCH are divided into one group, and PDSCH TDRA configurations used to schedule a plurality of PDSCHs are divided into one group. Optionally, the PDSCH TDRA configurations are grouped according to whether the TDRA table supports one DCI scheduling a plurality of PDSCHs. For example, PDSCH TDRA configurations included in the TDRA table used to support scheduling one DCI scheduling a plurality of PDSCHs are divided into one group, and PDSCH TDRA configurations included in the TDRA table used to support scheduling only one PDSCH by one DCI are divided into one group.

In some embodiments, all DL slots possibly including candidate PDSCH reception occasions are determined firstly, and then for respective DL slots, included candidate PDSCH reception occasions (or candidate PDSCH reception occasions may possibly not included) are determined according to, for example, SLIVs to which the respective DL slots correspond, thereby obtaining and determining the union of the candidate PDSCH reception occasions. All the DL slots possibly including candidate PDSCH reception occasions and the respective DL slots are determined respectively according to corresponding SLIVs, and SLIVs to which all the DL slots and the respective DL slots correspond are determined according to PDSCH TDRA configurations in the TDRA table and values of K1.

In some embodiments, corresponding candidate PDSCH reception occasions are determined for each TDRA table, and then the union of the candidate PDSCH reception occasions is determined.

In some embodiments, the candidate PDSCH reception occasions to which the values of K1 correspond are determined respectively according to PDSCH TDRA configurations in all the TDRA tables, and then the union of the candidate PDSCH reception occasions is determined.

In some embodiments, in 202, after determining the candidate PDSCH reception occasion set, an HARQ-ACK codebook containing HARQ-ACK information to which the candidate PDSCH reception occasion set corresponds is further generated. How to generate the codebook according to the candidate PDSCH reception occasion set shall be further described below.

In some embodiments, a size of the codebook does not dynamically change with an actual data scheduling situation, but is determined according to preconfigured (e.g. configured by higher layer signaling) or predefined parameters. Following description shall be given only for how to determine HARQ-ACK information bits of one serving cell.

In some embodiments, the number of HARQ-ACK information bits to which candidate PDSCH reception occasions of one serving cell correspond is related to an HARQ spatial binding parameter (harq-ACK-SpatialBundlingPUCCH), a code block group (CBG) configuration parameter (PDSCH-CodeBlockGroupTransmission) and a supported maximum codeword parameter (maxNrofCodeWordsScheduled-ByDCI) configured in the cell, as shown in Table 4 below by taking feeding back the HARQ-ACK information on a PUCCH as an example:

TABLE 4

| harq-ACK-SpatialBundlingPUCCH | PDSCH-CodeBlockGroupTransmission | maxNrofCodeWordsScheduledByDCI=2 | HARQ-ACK information bits for a candidate PDSCH reception occasion |
|---|---|---|---|
| no | no | yes | 2 bits, for a transport block (TB) |
| yes | / | yes | 1 bit |
| / | yes | yes | 2* $N_{HARQ-ACK,c}^{CBG/TB,max}$ bits, each $N_{HARQ-ACK,c}^{CBG/TB,max}$ bits for a TB |
| | yes | yes | $N_{HARQ-ACK,c}^{CBG/TB,max}$ bits |
| no | no | no | 1 bit |

What described above is illustrative only, and the mode for determining the number of HARQ-ACK information bits to which the candidate PDSCH reception occasions in one serving cell correspond is not limited thereto. In addition, a mode for determining values of information bits in the HARQ-ACK codebook is not limited in this disclosure. In some embodiments, as one candidate PDSCH reception occasion corresponds to one PDSCH, the HARQ-ACK information bits to which each candidate PDSCH reception occasion corresponds are arranged in an order of a second number of candidate PDSCH reception occasion in the candidate PDSCH reception occasion set, so as to obtain HARQ-ACK information bits of the one serving cell. If a candidate PDSCH reception occasion does not have a corresponding PDSCH, HARQ-ACK information bits to which it corresponds is set to be NACK. As described above, in the case where the codebook includes the HARQ-ACK information bits of one serving cell, the HARQ-ACK information bits of the one serving cell are fed back as the codebook, and in the case where the codebook includes HARQ-ACK information bits of a plurality of serving cells, a mode for determining HARQ-ACK information bits of each serving cell is identical to that for determining HARQ-ACK information bits of the one serving cell; however, in specific determination, such other parameters as PDSCH TDRA configurations to which each serving cell corresponds may possibly be identical or different. For example, the above parameters may be configured separately for each serving cells; however, this embodiment is not limited thereto. The HARQ-ACK information bits to which each serving cell corresponds may be arranged sequentially in an ascending order of indices of the serving cells, so as to generate a codebook for feedback.

How to generate a codebook is described above, and the PDSCH time domain resource allocation configuration shall further be described below.

In some embodiments, the PDSCH time domain resource allocation configuration includes one time domain offset K0 configuration. When the PDSCH time domain resource allocation includes one PDSCH time domain resource configuration, K0 denotes a slot offset between the one PDSCH and the PDCCH carrying the DCI scheduling the PDSCH, that is, the above first slot offset is equal to K0; and when the PDSCH time domain resource allocation includes a plurality of PDSCH time domain resource configurations, K0 denotes a slot offset between a first PDSCH and the PDCCH carrying the DCI scheduling the PDSCH, that is, the above first slot offset is equal to K0.

In some embodiments, the PDSCH time domain resource allocation configuration includes a plurality of K0 configurations. When the PDSCH time domain resource allocation includes a plurality of PDSCH time domain resource configurations, one K0 configuration is associated with one PDSCH time domain resource configuration, and one K0 denotes a slot offset between a PDSCH to which a PDSCH time domain resource configuration associated with it corresponds and the PDCCH, that is, the above first slot offset is equal to K0 to which the first PDSCH time domain resource configuration corresponds.

In some embodiments, the PDSCH time domain resource allocation configuration includes a plurality of K0 configurations. When the PDSCH time domain resource allocation includes a plurality of PDSCH time domain resource configurations, the plurality of PDSCH time domain resource configurations are divided into a predetermined number of groups, one K0 configuration is associated with one group of PDSCH time domain resource configurations, and one K0 denotes a slot offset between a first PDSCH in a group of PDSCH time domain resource configurations with which it is associated and the PDCCH, that is, the above first slot offset is equal to K0 to which a group containing the first PDSCH corresponds.

In some embodiments, slot positions of each PDSCH in the plurality of PDSCHs scheduled by the DCI may be determined according to the PDSCH TDRA configuration. When the PDSCH TDRA configuration is used to schedule a plurality of PDSCHs, the plurality of PDSCHs are located in at least two consecutive slots or at least two nonconsecutive slots. How to determine slots where the PDSCHs are located shall be described below.

In some embodiments, the PDSCH time domain resource allocation configuration for scheduling a plurality of PDSCHs includes one K0 configuration, K0 denoting a slot offset between the first PDSCH and the DCI/PDCCH used for scheduling the plurality of PDSCHs, and the plurality of PDSCHs are sequentially transmitted on a plurality of consecutive slots. Thus, slot positions of the plurality of PDSCHs may be sequentially determined.

In some embodiments, the PDSCH time domain resource allocation configuration for scheduling the plurality of PDSCHs includes a plurality of K0 configurations, wherein one K0 corresponds to one PDSCH, denoting an offset between a corresponding PDSCH and a PDCCH used for scheduling the PDSCH. Optionally, K0 may be included in the PDSCH time domain resource configuration, corresponding to each SLIV one by one. Thus, slot positions of the plurality of PDSCHs may be sequentially determined.

In some embodiments, a PDSCH TDRA configuration for scheduling a plurality of PDSCHs may include more than one K0 configurations. The plurality of PDSCHs are divided into a first number of groups, each group corresponding to one K0 configuration respectively. K0 denotes a slot offset between a first PDSCH in a corresponding PDSCH group and the PDCCH used to schedule the plurality of PDSCHs, and PDSCHs in the same PDSCH group are transmitted sequentially on a plurality of consecutive slots. Thus, a slot offset of each PDSCH in the plurality of PDSCHs may be determined.

In some embodiments, different from existing schemes, the PDSCH time domain resource allocation configuration further includes information on a second slot offset between different PDSCHs in the plurality of PDSCHs. For example, one PDSCH TDRA configuration used to schedule a plurality of PDSCHs includes a configuration of the second slot offset between different PDSCHs. For example, the PDSCH TDRA configuration may include one configuration of K0, K0 denoting a slot offset between a first PDSCH and the DCI used to schedule the plurality of PDSCHs; hence, the second slot offset denotes, for example, an interval between two adjacent PDSCHs, and the plurality of PDSCHs are sequentially transmitted on a plurality of slots according to the configured second slot offset. Thus, a slot offset of each PDSCH in the a plurality of PDSCHs may be determined.

For example, a plurality of PDSCHs may also be divided into PDSCH groups, and the PDSCH TDRA configuration for scheduling a plurality of PDSCHs includes configuration of the second slot offset between different PDSCH groups. For example, the PDSCH TDRA configuration may include a configuration of K0, K0 denoting a slot offset between a first PDSCH in a first PDSCH group and the DCI used to schedule the plurality of PDSCHs; the second slot offset denotes an interval between adjacent PDSCH groups, and PDSCHs in the same PDSCH group are sequentially transmitted on a plurality of consecutive slots. Thus, a slot offset of each PDSCH in the plurality of PDSCHs may be determined.

For example, a PDSCH TDRA configuration used to schedule a plurality of PDSCHs may include a configuration of the second slot offset between different PDSCHs and configurations of more than one K0. For example, a plurality of PDSCHs may be divided into PDSCH groups, each PDSCH group corresponding to a K0, K0 denoting a slot offset between a first PDSCH in a corresponding PDSCH group and the DCI used to schedule the plurality of PDSCHs, and configuring the second slot offset denotes offsets between different PDSCHs in the same PDSCH group. The above combined method is illustrative only, and this disclosure is not limited thereto.

In some embodiments, the PDSCH TDRA configuration may be included in a first allocation table. For example, the first allocation table may be determined according to PDSCH TDRA tables that may be applied by each DCI format, and then the PDSCH time domain resource allocation configuration may be determined according to the first allocation table. The first allocation table is also associated with an active DL BWP. The first allocation table is a union of time domain resource allocation tables of DCI formats needing to be monitored and configured by the UE on a serving cell c. For example, the first allocation table may include a union of all rows in a PDSCH TDRA table applied by the DCI formats needing to be monitored, and configuration of each row is identical to that of the PDSCH TDRA table. For example, for a specific active DL BWP, Table 3 is an example table of the first allocation table. As shown in Table 3, one PDSCH TDRA configuration (corresponding to one row of the first allocation table) includes at least one PDSCH time domain resource configuration, the PDSCH time domain resource configuration at least including symbol position (a starting symbol+length) configuration in a slot; in addition, one PDSCH TDRA configuration may further include at least one slot offset K0 configuration, K0 denoting a slot offset between the PDSCH and the PDCCH, and the K0 configuration being included or not included in the PDSCH time domain resource configuration; furthermore, one PDSCH TDRA configuration may include other information (such as a mapping mode), and other information configurations are included or not included in the PDSCH time domain resource configuration. The configuration of K0 shall be further explained below in detail, and shall not be enumerated herein. In addition, if the UE is configured with ReferenceofSLIV-ForDCIFormat1_2, new rows need to be added on the basis of a PDSCH TDRA table of DCI Format 1_2, which shall not be enumerated herein, and reference may be made to existing techniques for details.

TABLE 3

| R (Row index) | $K_0$ | start and length indicators SLIV | PDSCH mapping type |
|---|---|---|---|

In some embodiments, the PDSCH time domain resource allocation table used to support one DCI scheduling a plurality of PDSCHs is configured per BWP, the BWP being a DL BWP. For example, first indication information used to configure the table is included in a BWP configuration per BWP (e.g. BWP-DownlinkCommon, and BWP-DownlinkDedicated, etc.), and more specifically, included in a PDSCH configuration pdsch-Config included in the BWP configuration BWP-DownlinkCommon.

In some embodiments, the PDSCH TDRA table for supporting one DCI scheduling a plurality of PDSCHs includes at least one PDSCH TDRA configuration for supporting one DCI scheduling a plurality of PDSCHs. Meanwhile, the table may include or may not include a PDSCH TDRA configuration used to support one DCI scheduling one PDSCH. For example, the PDSCH TDRA table includes at least one (M) PDSCH TDRA configuration (at least one row), and at least one (P) of the M PDSCH TDRA configurations is used to support one DCI scheduling a plurality of PDSCHs, including M-P PDSCH TDRA configurations used to support one DCI scheduling one PDSCH; wherein, M is greater than or equal to P, and both M and P are integers greater than or equal to 1.

In some embodiments, the PDSCH TDRA configuration used to support one DCI scheduling a plurality of PDSCHs includes at least two PDSCH time domain resource configurations (e.g. at least two SLIVs, each of which corresponding to one PDSCH).

In some embodiments, the PDSCH TDRA configuration used to support one DCI scheduling one PDSCH includes only one PDSCH time domain resource configuration.

In some embodiments, the method may further include (not shown): the terminal equipment determines PDSCH time domain resource allocation tables applied by each DCI according to a first list, so as to determine the first allocation table, one column of the first list corresponding to the first indication information (e.g. pdsch-TimeDomainAllocation-ListForMultiPDSCH) used to configure the PDSCH TDRA table supporting one DCI scheduling a plurality of PDSCHs. The first indication information is included, for example, in PDSCH-Config. That is, the terminal equipment determines the PDSCH time domain resource allocation (TDRA) tables applied by each DCI according to the first list from the PDSCH time domain resource allocation (TDRA) tables that are predefined or configured by higher layer signaling.

For example, the first list is used to determine a PDSCH time domain resource allocation table applied by DCI of DCI format 1_1 or DCI format 1_2, and is not used to determine a PDSCH time domain resource allocation table applied by DCI of DCI format 10; for example, the DCI of DCI format 1_0 may use a second list to determine a PDSCH TDRA table applied by the DCI, contents included in the second list being, for example, identical to the tables for DCI formats 1_0 and 1_1 (applicable PDSCH time domain resource allocation for DCI formats 1_0 and 1_1). That is, the PDSCH TDRA tables applied by the DCI of DCI format 1_0 and DCI format 1_1 are determined based on different lists.

For example, one of differences between the first list and the second list is that the first list further includes one column corresponding to the first indication information (e.g. pdsch-TimeDomainAllocationListForMultiPDSCH) used to configure the PDSCH TDRA table for supporting one DCI scheduling a plurality of PDSCHs, while the second list does not include the column of the first indication information used to configure the PDSCH TDRA table for supporting one DCI scheduling a plurality of PDSCHs. In other words, in determining the PDSCH TDRA table applied by the DCI, the second list does not take the first indication information used to configure the PDSCH TDRA table for supporting one DCI scheduling a plurality of PDSCHs into account. Hence, it is impossibly that the PDSCH time domain resource allocation table applied by the DCI determined based on the second list is a PDSCH TDRA table for supporting one DCI scheduling a plurality of PDSCHs, and the PDSCH time domain resource allocation table applied by the DCI determined based on the first list may be a PDSCH TDRA table for supporting one DCI scheduling a plurality of PDSCHs.

In some embodiments, the format of the DCI is DCI format 1_1 or DCI format 1_2, and the PDSCH TDRA table applied by the DCI is unrelated to a radio network temporary identifier (RNTI) scrambling cyclic redundancy check (CRC) of the DCI. For example, when the RNTI is a cell radio network temporary identifier (C-RNTI), or a coding modulation scheme C-RNTI (MCS-C-RNTI), or a configuration scheduling RNTI (CS-RNTI), PDSCH TDRA tables applied by the DCI are identical. Table 1 below is an example table of the first list, wherein columns PDSCH-ConfigCommon includes pdsch-TimeDomainAllocation-List, and PDSCH-Config includes pdsch-TimeDomainAllocationList, which correspond respectively to the second indication information (i.e. pdsch-TimeDomainAllocation-List in PDSCH-ConfigCommon and pdsch-TimeDomainAllocationList in PDSCH-Config) used to configure cell-specific and UE-specific PDSCH TDRA tables for only supporting one DCI scheduling one PDSCH, and reference may be made to existing techniques for specific meanings thereof, which shall not be repeated herein any further. According to Table 1, for transmitting DCI in a common search space that is not associated with CORESET 0 (or in other words, a common search space of its associated CORESET is not a common search space of CORESET 0)

or a UE-dedicated search space, in the case where the PDSCH TDRA table for supporting one DCI scheduling a plurality of PDSCHs is configured (i.e. in the case where the first indication information (pdsch-TimeDomainAllocation-ListForMultiPDSCH) for configuring the PDSCH TDRA table PDSCH is included in PDSCH-Config, the DCI applies the PDSCH TDRA table for supporting one DCI scheduling a plurality of PDSCHs in scrambling by using the C-RNTI, or the MCS-C-RNTI, or the CS-RNTI.

information; and when the DCI is scrambled by a non-CS-RNTI (C-RNTI or MCS-C-RNTI), the PDSCH time domain resource allocation table applied by the DCI is the PDSCH time domain resource allocation table configured by the first indication information. As the DCI used for SPS activation must be scrambled by a CS-RNTI, even if the first indication information configures a PDSCH TDRA table supporting one DCI scheduling a plurality of PDSCHs, it is unable to be used for SPS activation.

TABLE 1

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource allocation to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI, CS-RNTI | Common search space that is not associated CORESET 0 | 1, 2, 3 | No | No | No | Default A |
| | | 1, 2, 3 | Yes | No | No | pdsch-TimeDomainAllocationList provided in PDSCH-ConfigCommon |
| | UE-dedicated search space | 1, 2, 3 | No/Yes | Yes | No | pdsch-TimeDomainAllocationList provided in PDSCH-Config |
| | | 1, 2, 3 | No/Yes | No/Yes | Yes | pdsch-TimeDomainAllocationListForMultiPDSCH provided in PDSCH-Config |

In some embodiments, the format of the DCI is DCI format 1_1 or DCI format 1_2, and the PDSCH time domain resource allocation tables applied by the DCI are different when different RNTIs are used for scrambling. For example, the PDSCH time domain resource allocation table applied when the CS-RNTI is used for scrambling is different from the PDSCH time domain resource allocation table applied when non-CS-RNTI (C-RNTI or MCS-C-RNTI) is used for scrambling.

For example, in a case where the DCI is scrambled by a non-CS-RNTI (C-RNTI or MCS-C-RNTI), the PDSCH time domain resource allocation table applied by the DCI is a PDSCH time domain resource allocation table used to support one DCI scheduling a plurality of PDSCHs; and when the DCI is scrambled by the CS-RNTI, the PDSCH time domain resource allocation table applied by the DCI is not a PDSCH time domain resource allocation table used to support one DCI scheduling a plurality of PDSCHs, in other words, when the DCI is scrambled by the CS-RNTI, the PDSCH time domain resource allocation table applied by the DCI is a PDSCH time domain resource allocation table only supporting one DCI scheduling one PDSCH.

Or, in other words, when the DCI is scrambled by the CS-RNTI, the PDSCH time domain resource allocation table applied by the DCI is not the PDSCH time domain resource allocation table configured by the first indication information; and when the DCI is scrambled by a non-CS-RNTI (C-RNTI or MCS-C-RNTI), the PDSCH time domain resource allocation table applied by the DCI is the PDSCH time domain resource allocation table configured by the first indication information.

Tables 2-1 and 2-2 below are example lists of the first list. A difference from Table 1 is that the PDSCH time domain resource allocation table applied in scrambling by using the CS-RNTI is different from the PDSCH time domain resource allocation table applied in scrambling by using a non-CS-RNTI (C-RNTI or MCS-C-RNTI). Additionally, in Table 2-1, the first indication information configures the PDSCH TDRA table supporting only one DCI scheduling one PDSCH and the PDSCH TDRA table supporting one DCI scheduling a plurality of PDSCHs simultaneously, and even if the first indication information configures the PDSCH TDRA table supporting one DCI scheduling a plurality of PDSCHs, the DCI with an RNTI that is a CS-RNTI may apply the PDSCH TDRA table supporting only one DCI scheduling one PDSCH; and in Table 2-2, the first indication information configures the PDSCH TDRA tables and the PDSCH TDRA tables not needing to simultaneously support only one DCI scheduling one PDSCH and support one DCI scheduling a plurality of PDSCHs, and when the first indication information configures the PDSCH TDRA table supporting one DCI scheduling a plurality of PDSCHs but does not configure the PDSCH TDRA table only supporting one DCI scheduling one PDSCH, the DCI format 1_1 with an RNTI that is a CS-RNTI may apply a predefined PDSCH TDRA table.

TABLE 2-1

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource allocation to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI | Common search space that is not associated CORESET 0 | 1, 2, 3 | No | No | No | Default A |
| | | 1, 2, 3 | Yes | No | No | pdsch-TimeDomainAllocationList provided in PDSCH-ConfigCommon |
| | UE-dedicated search space | 1, 2, 3 | No/Yes | Yes | No | pdsch-TimeDomainAllocationList provided in PDSCH-Config |
| | | 1, 2, 3 | No/Yes | Yes | Yes | pdsch-TimeDomainAllocationListForMultiPDSCH provided in PDSCH-Config |
| | | 1, 2, 3 | Yes | No | Yes | pdsch-TimeDomainAllocationListForMultiPDSCH provided in PDSCH-Config |
| CS-RNTI | Common search space that is not associated CORESET 0 | 1, 2, 3 | No | No | No | Default A |
| | | 1, 2, 3 | Yes | No | No/Yes | pdsch-TimeDomainAllocationList provided in PDSCH-ConfigCommon |
| | UE-dedicated search space | 1, 2, 3 | No/Yes | Yes | No/Yes | pdsch-TimeDomainAllocationList provided in PDSCH-Config |

TABLE 2-2

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource allocation to apply |
|---|---|---|---|---|---|---|
| C-RNTI, MCS-C-RNTI, CS-RNTI | Common search space associated with CORESET 0 | 1, 2, 3 | No | — | — | Default A |
| | | 1, 2, 3 | Yes | — | — | pdsch-TimeDomainAllocationList provided in PDSCH-ConfigCommon |
| C-RNTI, MCS-C-RNTI | Common search space that is not associated CORESET 0 | 1, 2, 3 | No | No | No | Default A |
| | | 1, 2, 3 | Yes | No | No | pdsch-TimeDomainAllocationList provided in PDSCH-ConfigCommon |
| | | 1, 2, 3 | No/Yes | Yes | No | pdsch-TimeDomainAllocationList provided in PDSCH-Config |
| | UE-dedicated search space | 1, 2, 3 | No/Yes | No/Yes | Yes | pdsch-TimeDomainAllo- |

TABLE 2-2-continued

| RNTI | PDCCH search space | SS/PBCH block and CORESET multiplexing pattern | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH | PDSCH time domain resource allocation to apply |
|---|---|---|---|---|---|---|
| | | | | | | cationListForMultiPDSCH provided in PDSCH-Config |
| CS-RNTI | Common search space that is not associated CORESET 0 | 1, 2, 3 | No | No | No | Default A |
| | | 1, 2, 3 | Yes | No | No/Yes | pdsch-TimeDomainAllocationList provided in PDSCH-ConfigCommon |
| | UE-dedicated search space | 1, 2, 3 | No/Yes | Yes | No/Yes | pdsch-TimeDomainAllocationList provided in PDSCH-Config |
| | | 1, 2, 3 | No | No | Yes | Default A |

In some embodiments, the format of the DCI is DCI format 1_1 or DCI format 1_2, and the PDSCH time domain resource allocation table applied by the DCI in SPS activation and/or SPS re-transmission (CRC of the DCI is scrambled by the CS-RNTI) is different from the PDSCH time domain resource allocation table applied in non-SPS activation and/or non-SPS re-transmission (CRC of the DCI is not scrambled by the CS-RNTI).

For example, when the DCI is used for SPS activation and/or SPS retransmission, the PDSCH time domain resource allocation table applied by the DCI is not used to support one DCI scheduling a plurality of PDSCHs. In other words, when the DCI is used for SPS activation and/or SPS re-transmission, the PDSCH time domain resource allocation table applied by the DCI is a PDSCH TDRA table supporting only one DCI scheduling one PDSCH; and when the DCI is used for non-SPS activation and/or non-SPS re-transmission, the PDSCH time domain resource allocation table applied by the DCI is used to support one DCI scheduling a plurality of PDSCHs.

Or, in other words, when the DCI is used for SPS activation and/or SPS retransmission, the PDSCH time domain resource allocation table applied by the DCI is not the PDSCH time domain resource allocation table configured by the first indication information; and when the DCI is used for non-SPS activation and/or non-SPS re-transmission, the PDSCH time domain resource allocation table applied by the DCI is the PDSCH time domain resource allocation table configured by the first RRC signaling.

As described above, in Tables 1, 2-1 and 2-2, the first indication information configures the PDSCH TDRA table for supporting one DCI scheduling a plurality of PDSCHs, that is, a value of pdsch-TimeDomainAllocationListForMultiPDSCH is YES, and the first indication information configures the PDSCH TDRA table for not supporting one DCI scheduling a plurality of PDSCHs in the PDSCH TDRA table, that is, a value of pdsch-TimeDomainAllocationList-ForMultiPDSCH is NO.

In some embodiments, the first list is used to determine the PDSCH time domain resource allocation table applied by the DCI with a format of DCI format 1_1, and may also be used to determine the PDSCH time domain resource allocation table applied by the DCI with a format of DCI format 1_0; for example, the table in the previous example may be regarded as the first table obtained by combining the third list and an existing second table, and at the same time, it is used to determine the PDSCH TDRA tables applied by the DCI with formats of DCI format 1_1 and DCI format 1_0.

It should be noted that FIGS. 2-6 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 2-6.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiment that HARQ-ACK information feedback for one DCI scheduling a plurality of PDSCHs is supported, thereby supporting a scheduling method for one DCI scheduling a plurality of PDSCHs, reducing a PDCCH monitoring burden of the UE, and reducing power loss and UE complexity.

Embodiments of a Second Aspect

The embodiments of this disclosure provides an information receiving method, which shall be described from a side of a network device, with parts repeated with those in the embodiments of the first aspect being not going to be described herein any further.

FIG. 12 is a schematic diagram of the information receiving method of the embodiment of this disclosure. As shown in FIG. 12, the method includes:

1201: the network device receives, an HARQ-ACK codebook generated according to a candidate PDSCH reception occasion set and transmitted by a terminal equipment; wherein the candidate PDSCH reception occasion set is determined according to a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined according to candidate PDSCH reception occasions to which a second slot corresponds determined according to a PDSCH time domain resource configuration to which the first slot corresponds.

In some embodiments, implementation of 1201 corresponds to 201-202 in the embodiments of the first aspect, with repeated parts being not going to be described herein any further.

In some embodiments, reference may be made to the embodiments of the first aspect for meanings of the candidate PDSCH reception occasion set, the first slot offset, the PDCCH monitoring capability, and the PDSCH group, etc., which shall not be repeated herein any further.

It can be seen from the above embodiment that HARQ-ACK information feedback for one DCI scheduling a plurality of PDSCHs is supported, thereby supporting a scheduling method for one DCI scheduling a plurality of PDSCHs, reducing a PDCCH monitoring burden of the UE, and reducing power loss and UE complexity.

Embodiments of a Third Aspect

The embodiments of this disclosure provides an information feeding back apparatus. The apparatus may be, for example, a terminal equipment, or may be one or more components or assemblies configured in a terminal equipment. Contents in this embodiment identical to those in the embodiments of the first aspect shall not be described herein any further.

Figure 8:
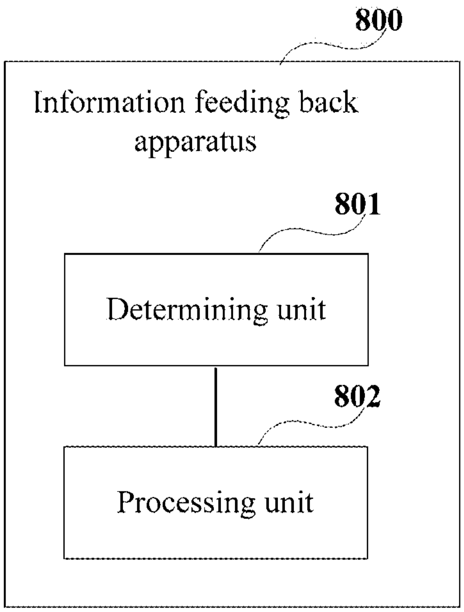
FIG. 8 is a schematic diagram of the information feeding back apparatus of an embodiment of this disclosure.

FIG. 8 is a schematic diagram of the information feeding back apparatus of the embodiment of this disclosure. As shown in FIG. 8, the information feeding back apparatus 800 includes:

- a determining unit 801 configured to determine a candidate PDSCH reception occasion set according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and
- a processing unit 802 configured to generate and transmit an HARQ-ACK codebook, the codebook including HARQ-ACK information to which the candidate PDSCH reception occasion set corresponds.

In some embodiments, reference may be made to 201-202 in the embodiments of the first aspect for implementations of the determining unit 801 and the processing unit 802, with repeated parts being not going to be described herein any further.

In some embodiments, the first slot offset is a slot offset between a time domain resource of a first PDSCH configured in PDSCH time domain resource allocation configurations and a PDCCH.

In some embodiments, the determining unit determines a time domain position of a PDCCH corresponding to the PDSCH time domain resource allocation configurations according to the first slot offset, and determines the candidate PDSCH reception occasions according to the PDCCH monitoring capability.

In some embodiments, the determining unit determines whether to receive the PDCCH at the time domain position of the PDCCH according to the PDCCH monitoring capability, so as to determine the candidate PDSCH reception occasions.

In some embodiments, the determining unit determines a time domain position of the PDCCH corresponding to the PDSCH time domain resource allocation configurations according to the first slot offset, and determines the candidate PDSCH reception occasions according to whether the PDCCH is able to be transmitted at the time domain position.

In some embodiments, the determining unit determines whether the PDCCH is able to be transmitted at the time domain position according to a transmission direction of the time domain position, and/or whether a search space corresponding to DCI is included in the time domain position, and/or whether a coreset associated with the search space corresponding to the DCI included in the domain position overlaps with an SSB.

In some embodiments, in a case where the terminal equipment is configured with an SPS, when DCI used for activating the SPS is received before a predetermined time for transmitting the codebook, the determining unit does not determine the candidate PDSCH reception occasion set according to the first slot offset and/or the PDCCH monitoring capability.

In some embodiments, in a case where the terminal equipment is configured with an SPS, the determining unit determines the candidate PDSCH reception occasion set according to a period configuration of the SPS.

In some embodiments, the determining unit is further configured to determine a PDSCH time domain resource configuration to which a slot corresponds according to the number and/or serial numbers of PDSCH time domain resource configurations included in the PDSCH time domain resource allocation configurations and a slot timing value.

In some embodiments, in a case where the first slot and the second slot correspond to PDSCH time domain resource configurations of different serial numbers in a first PDSCH time domain resource allocation configuration and PDSCH time domain resource configurations of different serial numbers in a second PDSCH time domain resource allocation configuration, the determining unit determines candidate PDSCH reception occasions to which the second slot corresponds according to whether the PDSCH time domain resource configuration in the first PDSCH time domain resource configuration to which the first slot corresponds and/or the PDSCH time domain resource configuration in the second PDSCH time domain resource allocation configuration conflict(s) with a semi-statically configured transmission direction, and/or according to whether a PDSCH time domain resource configuration in the first PDSCH time domain resource allocation configuration to which the first slot corresponds and/or a PDSCH time domain resource configuration in the second PDSCH time domain resource allocation configuration overlap, so as to determine the candidate PDSCH reception occasion set.

In some embodiments, the determining unit determines the candidate PDSCH reception occasion set according to a PDSCH time domain resource configuration corresponding to the codebook in the PDSCH time domain resource allocation configurations.

In some embodiments, in a case where the PDSCH time domain resource allocation configurations include a PDSCH time domain resource configuration not corresponding to the codebook, the determining unit does not determine the candidate PDSCH reception occasion set according to the PDSCH time domain resource configuration not corresponding to the codebook.

In some embodiments, the determining unit determines the PDSCH time domain resource configuration corresponding to the codebook included in PDSCH time domain resource allocation configurations according to the number and/or serial numbers and/or groups of the PDSCH time domain resource configurations included in the PDSCH time domain resource allocation configurations.

In some embodiments, the apparatus may further include (not shown): a second receiving unit configured to receive downlink control information (DCI) used to schedule a physical downlink shared channel (PDSCH), the DCI being used to indicate time domain resources of at least one (M) PDSCH, and the processing unit feeds back HARQ-ACK information to which the at least one PDSCH scheduled by the DCI corresponds via the same HARQ-ACK codebook or different HARQ-ACK codebooks.

In some embodiments, that the processing unit feeds back the at least one PDSCH scheduled by the DCI via different HARQ-ACK codebooks includes that:

the at least one PDSCH is divided into a first number of groups, HARQ-ACK information to which the same PDSCH group corresponds is fed back by the same HARQ-ACK codebook, and HARQ-ACK information to which different PDSCH groups correspond is fed back by different HARQ-ACK codebooks.

In some embodiments, the processing unit transmits the different HARQ-ACK codebooks on different slots.

In some embodiments, the codebook is transmitted via a PUCCH or a PUSCH.

In some embodiments, the plurality of PDSCHs in the PDSCH time domain resource allocation configurations used to schedule a plurality of PDSCHs are located in at least two consecutive slots or at least two nonconsecutive slots.

In some embodiments, the PDSCH time domain resource allocation configurations include one slot offset configuration, the one slot offset configuration configuring a slot offset between a first PDSCH in the plurality of PDSCHs in the PDSCH time domain resource allocation configurations used to schedule a plurality of PDSCHs and a PDCCH carrying DCI scheduling the PDSCH.

In some embodiments, the PDSCH time domain resource allocation configurations include a plurality of slot offset configurations, wherein each slot offset configuration is associated with a PDSCH time domain resource configuration for configuring a slot offset between a PDSCH corresponding to its associated PDSCH time domain resource configuration and the PDCCH, and different slot offset configurations correspond to different PDSCHs.

In some embodiments, the PDSCH time domain resource allocation configurations include a plurality of slot offset configurations, wherein each slot offset configuration is associated with a group of PDSCH time domain resource configurations for configuring a slot offset between a first PDSCH corresponding to its associated group of PDSCH time domain resource configurations and the PDCCH.

In some embodiments, the first slot offset is determined according to the slot offset configuration.

In some embodiments, the PDSCH time domain resource allocation configurations further include information on a second slot offset between different PDSCHs in a plurality of PDSCHs.

In some embodiments, the plurality of PDSCHs are divided into a first number of groups, and the second slot offset is an interval between different PDSCHs in the same group, or an interval between adjacent PDSCH groups.

Reference may be made to the embodiments of the first aspect for a specific method for generating the codebook, which shall not be repeated herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information feeding back apparatus 800 may further include other components or modules, and reference may be made to related techniques for particulars of these components or modules.

Furthermore, for the sake of simplicity, connection relationships between the components or modules or signal profiles thereof are only illustrated in FIG. 8. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

It can be seen from the above embodiment that HARQ-ACK information feedback for one DCI scheduling a plurality of PDSCHs is supported, thereby supporting a scheduling method for one DCI scheduling a plurality of PDSCHs, reducing a PDCCH monitoring burden of the UE, and reducing power loss and UE complexity.

Embodiments of a Fourth Aspect

The embodiment of this disclosure provides an information receiving apparatus. The device may be, for example, a network device, or one or some components or assemblies configured in the network device. Contents in this embodiment identical to those in the embodiments of the second aspect shall not be described herein any further.

Figure 9:
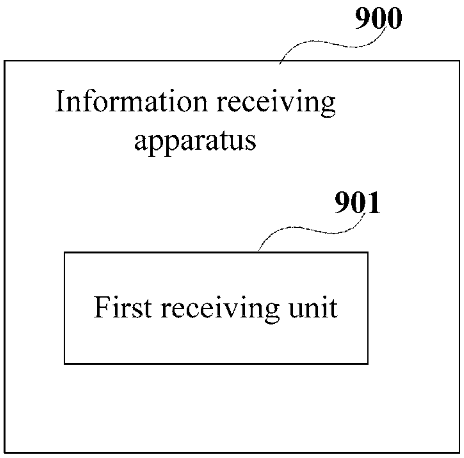
FIG. 9 is another schematic diagram of the information receiving apparatus of the embodiment of this disclosure.

FIG. 9 is a schematic diagram of the information receiving apparatus of the embodiment of this disclosure. As shown in FIG. 9, the information receiving apparatus 900 includes:

a first receiving unit 901 configured to receive an HARQ-ACK codebook generated according to a candidate PDSCH reception occasion set and transmitted by a terminal equipment; wherein the candidate PDSCH reception occasion set is determined according to a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined according to candidate PDSCH reception occasions to which a second slot corresponds determined according to a PDSCH time domain resource configuration to which the first slot corresponds.

In some embodiments, reference may be made to 1201 in the embodiments of the second aspect for implementations of the receiving unit 901, with repeated parts being not going to be described herein any further.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the information receiving apparatus 900 may further include other components or modules, and reference may be made to related techniques for particulars of these components or modules.

Furthermore, for the sake of simplicity, connection relationships between the components or modules or signal profiles thereof are only illustrated in FIG. 9. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that HARQ-ACK information feedback for one DCI scheduling a plurality of PDSCHs is supported, thereby supporting a scheduling method for one DCI scheduling a plurality of PDSCHs, reducing a PDCCH monitoring burden of the UE, and reducing power loss and UE complexity.

Embodiments of a Fifth Aspect

The embodiments of this disclosure provides a communication system, and reference may be made to FIG. 1, with contents identical to those in the embodiments of the first to the fourth aspects being not going to be described herein any further.

In some embodiments, the communication system 100 may at least include: a terminal equipment 102 and a network device 101.

In some embodiments, reference may be made to the terminal equipment 1100 for implementation of the terminal equipment 102, and reference may be made to the network device 100 for implementation of the network device, which shall not be described herein any further.

The embodiments of this disclosure further provides a network device, which may be, for example, a base station. However, this disclosure is not limited thereto, and it may also be another network device.

Figure 10:
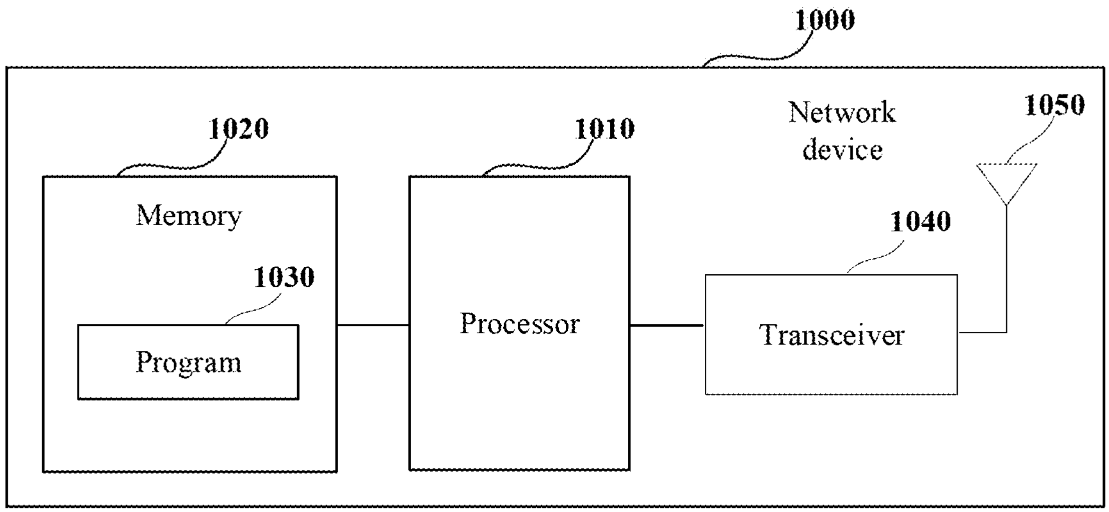
FIG. 10 is a schematic diagram of the network device of an embodiment of this disclosure.

FIG. 10 is a schematic diagram of a structure of the network device of the embodiment of this disclosure. As shown in FIG. 10, the network device 1000 may include a processor 1010 (such as a central processing unit (CPU)) and a memory 1020, the memory 1020 being coupled to the processor 1010. Wherein, the memory 1020 may store various data, and furthermore, it may store a program 1030 for information processing, and execute the program 1030 under control of the processor 1010.

For example, the processor 1010 may be configured to execute a program to carry out the information receiving method described in the embodiments of second aspect. For example, the processor 1010 may be configured to perform the following control: receiving an HARQ-ACK codebook generated according to a candidate PDSCH reception occasion set and transmitted by a terminal equipment; wherein the candidate PDSCH reception occasion set is determined according to a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined according to candidate PDSCH reception occasions to which a second slot corresponds determined according to a PDSCH time domain resource configuration to which the first slot corresponds.

Furthermore, as shown in FIG. 10, the network device 1000 may include a transceiver 1040, and an antenna 1050, etc. Wherein, functions of the above components are similar to those in the related art, and shall not be described herein any further. It should be noted that the network device 1000 does not necessarily include all the parts shown in FIG. 10, and furthermore, the network device 1000 may include parts not shown in FIG. 10, and the related art may be referred to.

The embodiments of this disclosure further provides a terminal equipment; however, this disclosure is not limited thereto, and it may also be another equipment.

Figure 11:
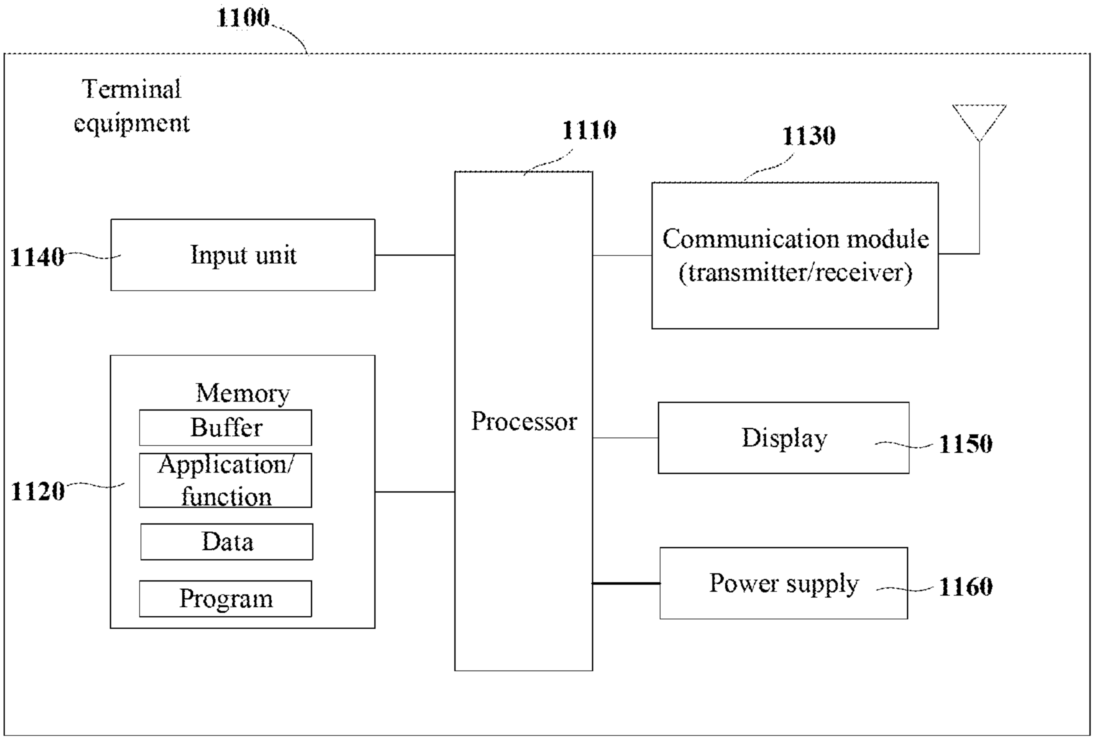
FIG. 11 is a schematic diagram of the terminal equipment of an embodiment of this disclosure.

FIG. 11 is a schematic diagram of the terminal equipment of the embodiment of this disclosure. As shown in FIG. 11, the terminal equipment 1100 may include a processor 1110 and a memory 1120, the memory 1120 storing data and a program and being coupled to the processor 1110. It should be noted that this figure is illustrative only, and other types of structures may also be used, so as to supplement or replace this structure and achieve a telecommunications function or other functions.

For example, the processor 1110 may be configured to execute a program to carry out the method as described in the embodiments of the first aspect. For example, the processor 1110 may be configured to perform the following control: determining a candidate PDSCH reception occasion set according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and generating and transmitting an HARQ-ACK codebook, the codebook including HARQ-ACK information to which the candidate PDSCH reception occasion set corresponds.

As shown in FIG. 11, the terminal equipment 1100 may further include a communication module 1130, an input unit 1140, a display 1150, and a power supply 1160; wherein functions of the above components are similar to those in the related art, which shall not be described herein any further. It should be noted that the terminal equipment 1100 does not necessarily include all the parts shown in FIG. 11, and the above components are not necessary. Furthermore, the terminal equipment 1100 may include parts not shown in FIG. 11, and the related art may be referred to.

An embodiment of this disclosure provides a computer program, which, when executed in a terminal equipment, will cause the terminal equipment to carry out the information feeding back method as described in the embodiment of the first aspect.

An embodiment of this disclosure provides a computer storage medium, including a computer program, which will cause a terminal equipment to carry out the information feeding back method as described in the embodiment of the first aspect.

An embodiment of this disclosure provides a computer program, which, when executed in a network device, will cause the network device to carry out the information receiving method as described in the embodiments of the second aspect.

An embodiment of this disclosure provides a computer storage medium, including a computer program, which will cause a network device to carry out the information receiving method as described in the embodiments of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. An information feeding back method, characterized in that the method includes:

determining a candidate PDSCH reception occasion set by a terminal equipment according to a first slot offset between a PDSCH and a PDCCH and/or a PDCCH monitoring capability and/or a PDSCH group and/or a first parameter, wherein the first parameter is used to identify whether a slot includes candidate PDSCH reception occasions and/or the number of included candidate PDSCH reception occasions, and/or determine a candidate PDSCH reception occasion to which a second slot corresponds according to PDSCH time domain resource configurations to which the first slot corresponds, so as to determine the candidate PDSCH reception occasion set; and generating and transmitting an HARQ-ACK codebook by the terminal equipment, the codebook including HARQ-ACK information to which the candidate PDSCH reception occasion set corresponds.

2. The method according to supplement 1, wherein the first slot offset is a slot offset between a time domain resource of a first PDSCH configured in the PDSCH time domain resource allocation configurations and a PDCCH.

3. The method according to supplement 1 or 2, wherein the determining a candidate PDSCH reception occasion includes:

determining a time domain position of a PDCCH corresponding to the PDSCH time domain resource allocation configurations by the terminal equipment according to the first slot offset; and determining the candidate PDSCH reception occasion by the terminal equipment according to the PDCCH monitoring capability.

4. The method according to supplement 3, wherein the terminal equipment determines whether to receive the PDCCH at the time domain position of the PDCCH according to the PDCCH monitoring capability, so as to determine the candidate PDSCH reception occasions.

5. The method according to any one of supplements 1-4, wherein the determining a candidate PDSCH reception occasion includes:

determining a time domain position of the PDCCH corresponding to the PDSCH time domain resource allocation configurations by the terminal equipment according to the first slot offset; and determining the candidate PDSCH reception occasions by the terminal equipment according to whether the PDCCH is able to be transmitted at the time domain position.

6. The method according to supplement 5, wherein the terminal equipment determines whether the PDCCH is able to be transmitted at the time domain position according to a transmission direction of the time domain position, and/or whether a search space corresponding to DCI is included in the time domain position, and/or whether a coreset associated with the search space corresponding to the DCI included in the domain position overlaps with an SSB.

7. The method according to any one of supplements 1-6, wherein the method further includes:

in a case where the terminal equipment is configured with an SPS, when DCI used for activating the SPS is received before a predetermined time for transmitting the codebook, not determining the candidate PDSCH reception occasion set by the terminal equipment according to the first slot offset and/or the PDCCH monitoring capability.

8. The method according to any one of supplements 1-6, wherein the method further includes:

in a case where the terminal equipment is configured with an SPS, determining the candidate PDSCH reception occasion set by the terminal equipment according to a period configuration of the SPS.

9. The method according to any one of supplements 1-8, wherein the terminal equipment determines a PDSCH time domain resource configuration to which a slot corresponds according to the number and/or serial numbers of PDSCH time domain resource configurations included in the PDSCH time domain resource allocation configurations and a slot timing value.

10. The method according to supplement 1 or 9, wherein the determining a candidate PDSCH reception occasion to which a second slot corresponds according to PDSCH time domain resource configurations to which the first slot corresponds, so as to determine the candidate PDSCH reception occasion set, includes:

in a case where the first slot and the second slot correspond to PDSCH time domain resource configurations of different serial numbers in a first PDSCH time domain resource allocation configuration and PDSCH time domain resource configurations of different serial numbers in a second PDSCH time domain resource allocation configuration, determining candidate PDSCH reception occasions to which the second slot corresponds according to whether the PDSCH time domain resource configuration in the first PDSCH time domain resource configuration to which the first slot corresponds and/or the PDSCH time domain resource configuration in the second PDSCH time domain resource allocation configuration conflict(s) with a semi-statically configured transmission direction, and/or according to whether a PDSCH time domain resource configuration in the first PDSCH time domain resource allocation configuration to which the first slot corresponds and/or a PDSCH time domain resource configuration in the second PDSCH time domain resource allocation configuration overlap, so as to determine the candidate PDSCH reception occasion set.

11. The method according to any one of supplements 1-10, wherein the determining the candidate PDSCH reception occasion set according to the PDSCH group includes:

determining the candidate PDSCH reception occasion set by the terminal equipment according to a PDSCH time domain resource configuration corresponding to the codebook in the PDSCH time domain resource allocation configurations.

12. The method according to supplement 11, wherein in a case where the PDSCH time domain resource allocation configurations include a PDSCH time domain resource configuration not corresponding to the codebook, the terminal equipment does not determine the candidate PDSCH reception occasion set according to the PDSCH time domain resource configuration not corresponding to the codebook.

13. The method according to any one of supplements 1-12, wherein the terminal equipment determines the PDSCH time domain resource configuration corresponding to the codebook in the PDSCH time domain resource allocation configurations according to the number and/or serial numbers and/or groups of the PDSCH time domain resource configurations included in the PDSCH time domain resource allocation configurations.

14. The method according to any one of supplements 1-13, wherein the method further includes:

receiving, by the terminal equipment, downlink control information (DCI) used to schedule a physical downlink shared channel (PDSCH), the DCI being used to indicate time domain resources of at least one (M) PDSCH; and feeding back HARQ-ACK information to which the at least one PDSCH scheduled by the DCI corresponds by the terminal equipment via the same HARQ-ACK codebook or different HARQ-ACK codebooks.

15. The method according to supplement 14, wherein the feeding back the at least one PDSCH scheduled by the DCI by the terminal equipment via different HARQ-ACK codebooks includes that:

the at least one PDSCH is divided into a first number of groups, HARQ-ACK information to which the same PDSCH group corresponds is fed back by the same HARQ-ACK codebook, and HARQ-ACK information to which different PDSCH groups correspond is fed back by different HARQ-ACK codebooks.

16. The method according to supplement 14, wherein the terminal equipment transmits the different HARQ-ACK codebooks on different slots.

17. The method according to any one of supplements 1-16, wherein the codebook is transmitted via a PUCCH or a PUSCH.

18. The method according to any one of supplements 1-17, wherein, the plurality of PDSCHs in the PDSCH time domain resource allocation configurations used to schedule a plurality of PDSCHs are located in at least two consecutive slots or at least two nonconsecutive slots.

19. The method according to supplement 18, wherein, the PDSCH time domain resource allocation configurations include one slot offset configuration, the one slot offset configuration configuring a slot offset between a first PDSCH in the plurality of PDSCHs in the PDSCH time domain resource allocation configurations and a PDCCH carrying the DCI scheduling the PDSCH.

20. The method according to supplement 18, wherein, the PDSCH time domain resource allocation configurations include a plurality of slot offset configurations, wherein each slot offset configuration is associated with a PDSCH time domain resource configuration and is used to configure a slot offset between a PDSCH to which the PDSCH time domain resource configuration associated with it corresponds and the PDCCH, and different slot offset configurations correspond to different PDSCHs.

21. The method according to supplement 18, wherein, the PDSCH time domain resource allocation configurations include a plurality of slot offset configurations, wherein each slot offset configuration is associated with a group of PDSCH time domain resource configurations and is used to configure a slot offset between a first PDSCH to which a group of PDSCH time domain resource configurations associated with it corresponds and the PDCCH.

22. The method according to supplement 19 or 20 or 21, wherein, the first slot offset is determined according to the slot offset configurations.

23. The method according to supplement 19 or 20 or 21, wherein, the PDSCH time domain resource allocation configurations further include information on a second slot offset between different PDSCHs in a plurality of PDSCHs.

24. The method according to supplement 21 or 23, wherein the plurality of PDSCHs are divided into a first number of groups, and the second slot offset is an interval between different PDSCHs in the same group, or an interval between neighboring PDSCH groups.

25. An information receiving method, characterized in that the method includes:

receiving, by a network device, an HARQ-ACK codebook generated according to a candidate PDSCH reception occasion set and transmitted by a terminal equipment; wherein the candidate PDSCH reception occasion set is determined according to a first slot offset between a PDSCH and a PDCCH and/or a PDCCH monitoring capability and/or a PDSCH group and/or a first parameter, the first parameter being used to identify whether a slot includes candidate PDSCH reception occasions and/or the number of included candidate PDSCH reception occasions, and/or is determined according to candidate PDSCH reception occasions to which a second slot corresponds determined according to a PDSCH time domain resource configuration to which the first slot corresponds.

26. A network device, including a memory and a processor, the memory storing a computer program, and the processor being configured to execute the computer program to carry out the information receiving method as described in supplement 25.

27. A terminal equipment, including a memory and a processor, the memory storing a computer program, and the processor being configured to execute the computer program to carry out the information feeding back method as described in any one of supplements 1-24.

28. A communication system, including:

the terminal equipment as described in supplement 27, and/or the network device as described in supplement 26.

The invention claimed is:

1. An information feeding back apparatus, applicable to a terminal equipment, the apparatus comprising:

a receiver configured to receive downlink control information (DCI) used to schedule at least one physical downlink shared channel (PDSCH);

processor circuitry configured to:

determine a candidate PDSCH reception occasion set according to a slot offset between a PDSCH and a PDCCH, and determine HARQ-ACK information bits of an HARQ-ACK codebook according to the candidate PDSCH reception occasion set, the HARQ-ACK codebook including HARQ-ACK information bits to which the at least one physical downlink shared channel (PDSCH) corresponds; and a transmitter configured to transmit the HARQ-ACK codebook in an uplink slot with an index being n+k, wherein slot n is a last uplink slot overlapped with an end slot of the at least one physical downlink shared channel, and k is the number of slots, wherein the candidate PDSCH reception occasion set includes a second number (A) of candidate PDSCH reception occasions, the HARQ-ACK codebook includes HARQ-ACK information bits to which the second number (A) of candidate PDSCH reception occasions correspond, the second number being a natural number, wherein the second number (A) of candidate PDSCH reception occasions correspond to a same serving cell.

2. The apparatus according to claim 1, wherein a TDRA (Time Domain Resource Allocation) table applied by the DCI being used to support one DCI scheduling a plurality of PDSCHs.

3. The apparatus according to claim 2, wherein the TDRA table includes at least one row of PDSCH TDRA configuration for supporting one DCI scheduling a plurality of PDSCHs.

4. The apparatus according to claim 3, wherein the PDSCH TDRA configuration includes at least one slot offset, start and length indicator (SLIV) and PDSCH mapping type.

5. The apparatus according to claim 3, wherein the TDRA table further includes or does not include a PDSCH TDRA configuration for supporting one DCI scheduling one PDSCH.

6. The apparatus according to claim 2, wherein the TDRA table is configured by first indication information for DL BWP (per DL BWP), the first indication information corresponding to a column of a first list.

7. The apparatus according to claim 6, wherein the first list is used to determine the TDRA table applied by the DCI.

8. The apparatus according to claim 6, wherein the first indication information is included in a PDSCH configuration (PDSCH-Config).

9. The apparatus according to claim 2, wherein the processor circuitry determines a first allocation table, wherein the first allocation table includes rows of the TDRA table.

10. The apparatus according to claim 9, wherein the first allocation table includes union of PDSCH time-domain resource allocation configuration in TDRA tables of DCI formats of PDCCH that should be monitored in a serving cell c configured for the terminal equipment.

11. The apparatus according to claim 9, wherein the processor circuitry determines a candidate PDSCH reception occasion set according to the slot offset between a PDSCH and a PDCCH, which includes: when at least one row in the first allocation table includes a plurality of start and length indicators (SLIVs), determining slot timing values set according to the slot offset, and the processor circuitry determines the candidate PDSCH reception occasion set according to the slot timing values set.

12. The apparatus according to claim 1, wherein the k is indicated by an information field used to indicate HARQ-ACK information feedback timing in the DCI and/or second configuration information configured by higher-layer signaling.

13. The apparatus according to claim 1, wherein the number of HARQ-ACK information bits to which candidate PDSCH reception occasions correspond of a serving cell is related to a HARQ spatial bundling parameter (harq-ACK-SpatialBundlingPUCCH) configured for the serving cell, a coding block group (CBG) configuration parameter (PDSCH-CodeBlockGroupTransmission) and a supported maximum codeword parameter (maxNrofCodeWordsScheduledByDCI).

14. The apparatus according to claim 1, wherein in the case where a candidate PDSCH reception occasion has no corresponding PDSCH, its corresponding HARQ-ACK information bits are set to be NACK.

15. The apparatus according to claim 1, wherein in the case where a codebook includes HARQ-ACK information bits of one serving cell, the HARQ-ACK information bits of the one serving cell is fed back as a codebook, and in the case where a codebook includes the HARQ-ACK information bits of a plurality of serving cells, a mode for determining HARQ-ACK information bits of each serving cell is identical to a mode for determining the HARQ-ACK information bits of the one serving cell.

16. The apparatus according to claim 1, wherein the codebook is transmitted via a PUCCH or a PUSCH.

17. The apparatus according to claim 1, wherein the plurality of PDSCHs in the PDSCH time domain resource allocation configurations used to schedule a plurality of PDSCHs are located in at least two consecutive slots or at least two nonconsecutive slots.

18. An information receiving apparatus, applicable to a network device, the apparatus comprising:

a transmitter configured to transmit downlink control information (DCI) used to schedule at least one physical downlink shared channel (PDSCH) to a terminal equipment; and a receiver configured to receive an HARQ-ACK codebook in an uplink slot with an index being n+k transmitted by the terminal equipment, wherein n is a last uplink slot overlapped with an end slot of the at least one physical downlink shared channel, and k is the number of slots;

the HARQ-ACK codebook including HARQ-ACK information bits to which the at least one physical downlink shared channel (PDSCH) corresponds, the HARQ-ACK information bits of the HARQ-ACK codebook being determined according to a candidate PDSCH reception occasion set; the candidate PDSCH reception occasion set being determined according to a slot offset between a PDSCH and a PDCCH, wherein the candidate PDSCH reception occasion set includes a second number (A) of candidate PDSCH reception occasions, the HARQ-ACK codebook includes HARQ-ACK information bits to which the second number (A) of candidate PDSCH reception occasions correspond, the second number being a natural number, wherein the second number (A) of candidate PDSCH reception occasions correspond to a same serving cell.

19. A communication system comprising:

a transmitter configured to transmit downlink control information (DCI) used to schedule at least one physical downlink shared channel (PDSCH); and a terminal comprising:

a receiver configured to receive the DCI, processor circuitry configured to determine a candidate PDSCH reception occasion set according to a slot offset between a PDSCH and a PDCCH, determine HARQ-ACK information bits of an HARQ-ACK codebook according to the candidate PDSCH reception occasion set, the HARQ-ACK codebook including HARQ-ACK information bits to which the at least one physical downlink shared channel (PDSCH) corresponds, and transmit the HARQ-ACK codebook in an uplink slot with an index being n+k, wherein n is a last uplink slot overlapped with an end slot of the at least one physical downlink shared channel, and k is the number of slots, wherein the candidate PDSCH reception occasion set includes a second number (A) of candidate PDSCH reception occasions, the HARQ-ACK codebook includes HARQ-ACK information bits to which the second number (A) of candidate PDSCH reception occasions correspond, the second number being a natural number, wherein the second number (A) of candidate PDSCH reception occasions correspond to a same serving cell.

* * * * *